US012748515B2

(12) United States Patent
Bok

(10) Patent No.: US 12,748,515 B2
(45) Date of Patent: Sep. 29, 2026

(54) ELECTRONIC DEVICE

(71) Applicant: Samsung Display Co., Ltd., Yongin-si (KR)

(72) Inventor: Seung-Lyong Bok, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/030,423

(22) Filed: Jan. 17, 2025

(65) Prior Publication Data

US 2025/0370575 A1 Dec. 4, 2025

(30) Foreign Application Priority Data

May 28, 2024 (KR) ........................ 10-2024-0069486

(51) Int. Cl.
*G06F 3/044* (2006.01)
*G06F 3/041* (2006.01)

(52) U.S. Cl.
CPC ........ *G06F 3/0446* (2019.05); *G06F 3/04162* (2019.05); *G06F 2203/04106* (2013.01)

(58) Field of Classification Search
CPC ............... G06F 3/0446; G06F 3/04162; G06F 2203/04106
See application file for complete search history.

(56) References Cited

U.S. PATENT DOCUMENTS 10,430,012 B2 10/2019 Mizuhashi et al.
11,385,739 B2 7/2022 Kurasawa et al.
11,556,216 B2 1/2023 Blondin et al.
11,846,966 B2 * 12/2023 Kim ...................... G06F 3/0446
2014/0078104 A1 * 3/2014 Lee ...................... G06F 3/0446 345/174
2016/0062512 A1 * 3/2016 Ishizaki ................ G06F 3/0446 29/830
2017/0024037 A1 * 1/2017 Ishizaki ................ G06F 3/0446
2017/0139525 A1 * 5/2017 Jo ......................... G06F 3/0443
2019/0196619 A1 * 6/2019 Baek ................... G06F 3/04164
2020/0096828 A1 * 3/2020 Ahn .................. G02F 1/136286
2020/0176527 A1 * 6/2020 An ........................ G09G 3/3225
2020/0176551 A1 * 6/2020 Park ...................... H10K 50/86
2023/0209899 A1 * 6/2023 Kim ................... H10K 59/1213 257/40

(Continued)

*Primary Examiner* — Amy Onyekaba
(74) *Attorney, Agent, or Firm* — Womble Bond Dickinson (US) LLP

(57) ABSTRACT

An electronic device includes: a display layer having a display area, and a non-display area adjacent to the display area, the display layer including: a base layer; a circuit layer on the base layer, and including: a pixel driving circuit; and a plurality of first auxiliary electrodes electrically connected with one another, the plurality of first auxiliary electrodes located along a first direction, and extending in a second direction crossing the first direction; a light emitting element layer on the circuit layer, and including a light emitting element electrically connected with the pixel driving circuit; and an encapsulation layer on the light emitting element layer; and a sensor layer on the display layer, and including: a plurality of first electrodes located along the first direction, and extending in the second direction; and a plurality of second electrodes located along the second direction, and extending in the first direction.

23 Claims, 24 Drawing Sheets

(56) References Cited

U.S. PATENT DOCUMENTS

| | | | | |
|---|---|---|---|---|
| 2023/0280853 | A1* | 9/2023 | Jeon | G06F 3/0446 |
| 2023/0326234 | A1* | 10/2023 | Ahn | G06V 40/1318 |
| 2023/0409142 | A1* | 12/2023 | Lim | G06F 3/04166 |
| 2024/0004503 | A1* | 1/2024 | Park | G06F 3/0446 |
| 2024/0029629 | A1 | 1/2024 | Ding et al. | |
| 2024/0046873 | A1* | 2/2024 | Roh | G09G 3/3233 |
| 2024/0054940 | A1* | 2/2024 | Jo | H10K 59/123 |
| 2024/0054953 | A1* | 2/2024 | Jeong | G09G 3/3233 |
| 2024/0072103 | A1* | 2/2024 | Lee | H10H 29/142 |
| 2024/0143098 | A1* | 5/2024 | Lim | G06F 3/0412 |
| 2024/0147772 | A1* | 5/2024 | Bae | H10K 59/122 |
| 2024/0147773 | A1* | 5/2024 | Kim | H10K 59/122 |
| 2024/0160325 | A1* | 5/2024 | Kim | G06F 3/0445 |

* cited by examiner

ELECTRONIC DEVICE

CROSS-REFERENCE TO RELATED APPLICATION

The present application claims priority to and the benefit of Korean Patent Application No. 10-2024-0069486, filed on May 28, 2024, in the Korean Intellectual Property Office, the entire disclosure of which is incorporated by reference herein.

BACKGROUND

Aspects of embodiments of the present disclosure relate to an electronic device for sensing an input by a pen.

Multimedia electronic devices, such as a television, a mobile phone, a tablet computer, a notebook computer, a car navigation unit, a game machine, and the like, include a display device for displaying an image. The electronic devices may include a sensor layer (e.g., an input sensor) capable of providing a touch-based input method that enables a user to intuitively and conveniently input information or instructions in an easy and simple manner, in addition to other input methods, such as a button, a keyboard, a mouse, or the like. The sensor layer may sense the user's touch or pressure. Meanwhile, demand for the use of pens by users who may be accustomed to inputting information using writing instruments or pens for more accurate touch inputs in specific application programs (e.g., application programs for sketching or drawing) have been increasing.

The above information disclosed in this Background section is for enhancement of understanding of the background of the present disclosure, and therefore, it may contain information that does not constitute prior art.

SUMMARY

One or more embodiments of the present disclosure may be directed to an electronic device for sensing an input by a pen.

According to one or more embodiments of the present disclosure, an electronic device includes: a display layer having a display area, and a non-display area adjacent to the display area, the display layer including: a base layer; a circuit layer on the base layer, and including: a pixel driving circuit; and a plurality of first auxiliary electrodes electrically connected with one another, the plurality of first auxiliary electrodes located along a first direction, and extending in a second direction crossing the first direction; a light emitting element layer on the circuit layer, and comprising a light emitting element electrically connected with the pixel driving circuit; and an encapsulation layer on the light emitting element layer; and a sensor layer on the display layer, and including: a plurality of first electrodes located along the first direction, and extending in the second direction; and a plurality of second electrodes located along the second direction, and extending in the first direction.

In an embodiment, the circuit layer may further include a plurality of dummy pixel circuits at the same layer as that of the pixel driving circuit, and the plurality of dummy pixel circuits may overlap with the plurality of first auxiliary electrodes in a plan view.

In an embodiment, the pixel driving circuit may not overlap with the plurality of first auxiliary electrodes in a plan view.

In an embodiment, the circuit layer may further include a connecting line in the non-display area, and connected with the plurality of first auxiliary electrodes.

In an embodiment, the circuit layer may further include a data line configured to receive a data signal, and electrically connected with the pixel driving circuit. The plurality of first auxiliary electrodes may be at the same layer as that of the data line.

In an embodiment, the circuit layer may further include a first power line configured to provide a first driving voltage to the pixel driving circuit, the first power line being located at the same layer as that of the data line.

In an embodiment, the circuit layer may further include a plurality of second auxiliary electrodes located along the second direction, and extending in the first direction. The plurality of first auxiliary electrodes may be insulated from the plurality of second auxiliary electrodes, and may cross the plurality of second auxiliary electrodes.

In an embodiment, the electronic device may further include: a sensor driver configured to drive the sensor layer, and the sensor driver may be configured to provide a charging signal having a sinusoidal wave to the plurality of first auxiliary electrodes.

In an embodiment, the pixel driving circuit may include a driving transistor including a gate electrode, and the plurality of first auxiliary electrodes may be at the same layer as that of the gate electrode.

In an embodiment, the plurality of first auxiliary electrodes may overlap with the pixel driving circuit in a plan view.

In an embodiment, the pixel driving circuit may include a driving transistor including: a gate electrode; and an upper electrode over the gate electrode.

In an embodiment, the plurality of first auxiliary electrodes may be at the same layer as that of the upper electrode.

In an embodiment, each of the plurality of first auxiliary electrodes may include a first portion, and a second portion over the first portion and connected with the first portion through a contact. The first portion may be at the same layer as that of the gate electrode, and the second portion may be at the same layer as that of the upper electrode.

In an embodiment, the circuit layer may further include a lower metal layer under the gate electrode.

In an embodiment, the sensor layer may further include: a plurality of second auxiliary electrodes along the first direction, and extending in the second direction; and a plurality of third auxiliary electrodes along the second direction, and extending in the first direction.

In an embodiment, the plurality of first electrodes may be at a different layer from that of the plurality of second auxiliary electrodes.

According to one or more embodiments of the present disclosure, an electronic device includes: a display layer including: a base layer; a circuit layer on the base layer, and including: a pixel driving circuit; and a plurality of first auxiliary electrodes along a first direction and extending in a second direction crossing the first direction, the plurality of first auxiliary electrodes being electrically connected with one another; a light emitting element layer on the circuit layer, and including a light emitting element electrically connected with the pixel driving circuit; and an encapsulation layer on the light emitting element layer; a sensor layer on the display layer, the sensor layer including a plurality of sensing electrodes; and a sensor driver configured to drive the sensor layer, and provide a charging signal having a period to the plurality of first auxiliary electrodes.

In an embodiment, the circuit layer may further include a plurality of dummy pixel circuits at the same layer as that of the pixel driving circuit, and the plurality of dummy pixel circuits may overlap with the plurality of first auxiliary electrodes in a plan view.

In an embodiment, the circuit layer may further include a data line configured to receive a data signal, and electrically connected with the pixel driving circuit. The plurality of first auxiliary electrodes may be at the same layer as that of the data line.

In an embodiment, the pixel driving circuit may include a driving transistor including a gate electrode, and the plurality of first auxiliary electrodes may be at the same layer as that of the gate electrode.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
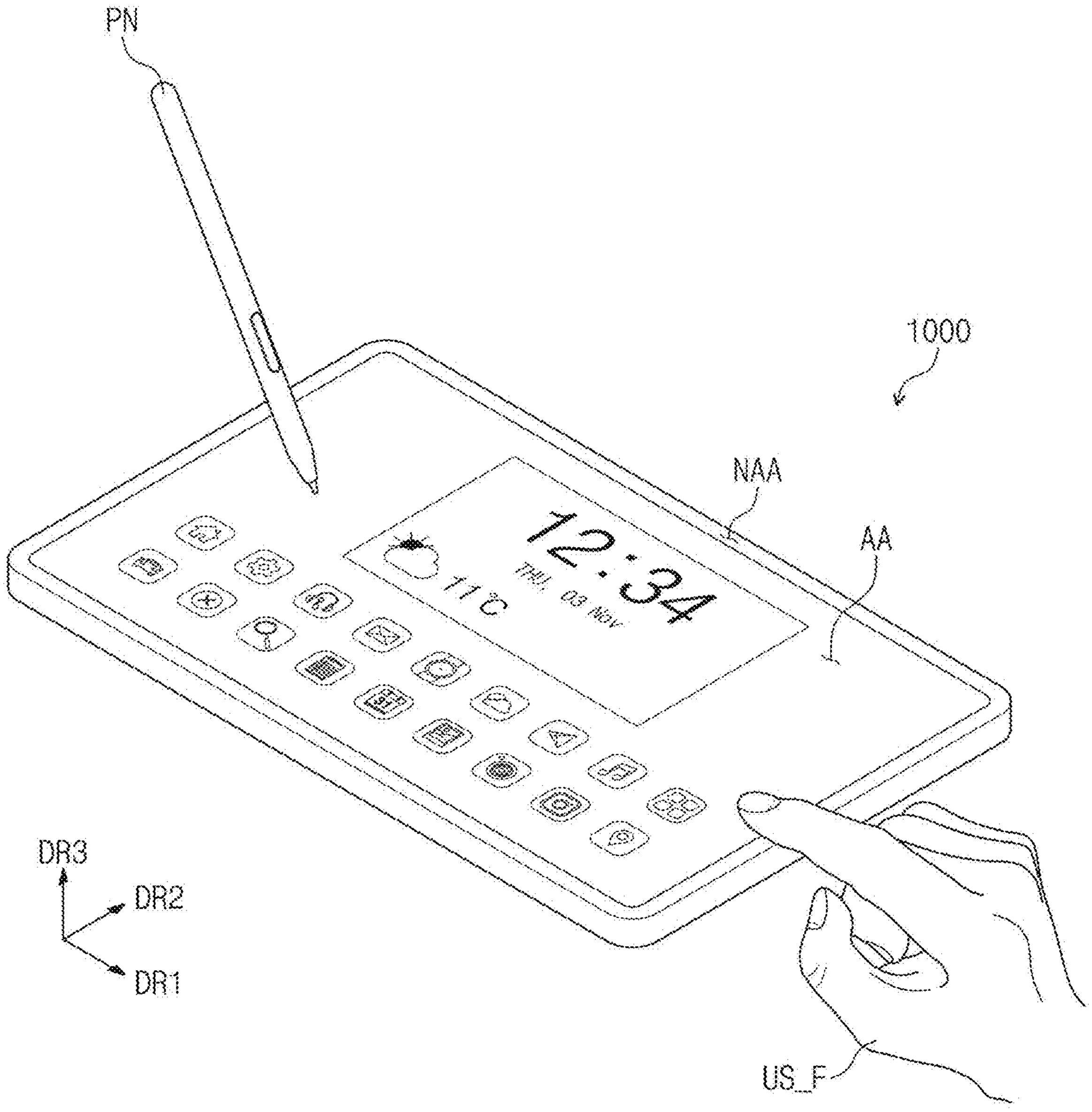
FIG. 1 is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

As used herein, the terms "part" and "unit" may refer to a software component or a hardware component that performs a described function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-codes, circuits, data, databases, data structures, tables, arrays, variables, and/or the like.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of an electronic device according to an embodiment of the present disclosure.

Referring to FIG. 1, the electronic device 1000 may be a device that is activated depending on an electrical signal. For example, the electronic device 1000 may be a mobile phone, a foldable mobile phone, a notebook computer, a television, a tablet computer, a car navigation unit, a game machine, or a wearable device, but the present disclosure is not limited thereto. In FIG. 1, the electronic device 1000 is illustrated as a tablet computer as a representative example.

The electronic device 1000 may display an image, and may sense an input (e.g., an external input) applied from the outside. The external input may be a user input. The user input may include various suitable kinds of external inputs, such as a part US_F of a user's body, a pen PN, light, heat, or pressure. The user input may include all suitable inputs capable of changing the capacitance of an input sensor.

The electronic device 1000 may include an active area AA and a peripheral area NAA defined therein. The electronic device 1000 may display an image through the active area AA. The active area AA may include a plane defined by a first direction DR1 and a second direction DR2. The peripheral area NAA may surround (e.g., around a periphery of) the active area AA. In an embodiment of the present disclosure, the peripheral area NAA may be omitted as needed or desired.

The thickness direction of the electronic device 1000 may be parallel to or substantially parallel to a third direction DR3 that crosses the first direction DR1 and the second direction DR2. Accordingly, front surfaces (e.g., upper surfaces) and rear surfaces (e.g., lower surfaces) of members constituting the electronic device 1000 may be defined based on the third direction DR3.

Although the electronic device 1000 of a bar kind is illustrated in FIG. 1, the present disclosure is not limited thereto. For example, the description hereinafter may be applied to various suitable kinds of electronic devices, such as a foldable electronic device, a rollable electronic device, and a slidable electronic device.

Figure 2:
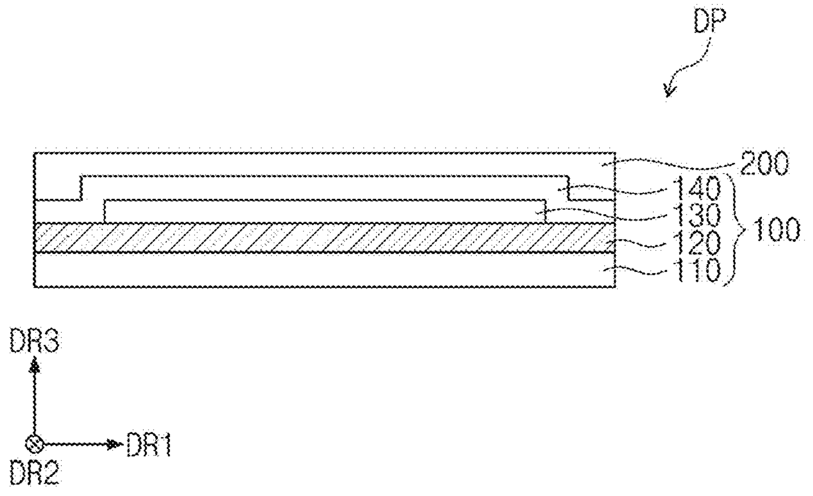
FIG. 2 is a schematic sectional view of the electronic device according to an embodiment of the present disclosure.

FIG. 2 is a schematic sectional view of the electronic device according to an embodiment of the present disclosure.

Referring to FIG. 2, the electronic device 1000 may include a display layer 100 and a sensor layer 200.

The display layer 100 may be a component that generates or substantially generates an image. The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, or a polymer substrate, but the present disclosure is not particularly limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a suitable process, such as coating or deposition. The insulating layer, the semiconductor layer, and the conductive layer may be selectively subjected to patterning by performing a photolithography process a plurality of times.

The light emitting element layer 130 may be disposed on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be disposed on the light emitting element layer 130. The encapsulation layer 140 may protect the light emitting element layer 130 from foreign matter, such as moisture, oxygen, and dust particles.

The sensor layer 200 may be disposed on the display layer 100. The sensor layer 200 may sense an external input applied from the outside. The sensor layer 200 may be an integrated sensor that is continuously formed in the process of manufacturing the display layer 100. As another example, the sensor layer 200 may be an external sensor that is attached to the display layer 100. The sensor layer 200 may be referred to as a sensor, an input sensing layer, an input sensing panel, or an electronic device for sensing input coordinates.

According to an embodiment of the present disclosure, the sensor layer 200 may sense an input by a passive input means, such as a part of the user's body, and the display layer 100 or the sensor layer 200 may sense an input by an input device that generates a magnetic field having a suitable resonant frequency (e.g., a predetermined resonant frequency). The input device may be referred to as a pen, an input pen, a magnetic pen, a stylus pen, or an electromagnetic resonance pen.

Figure 3:
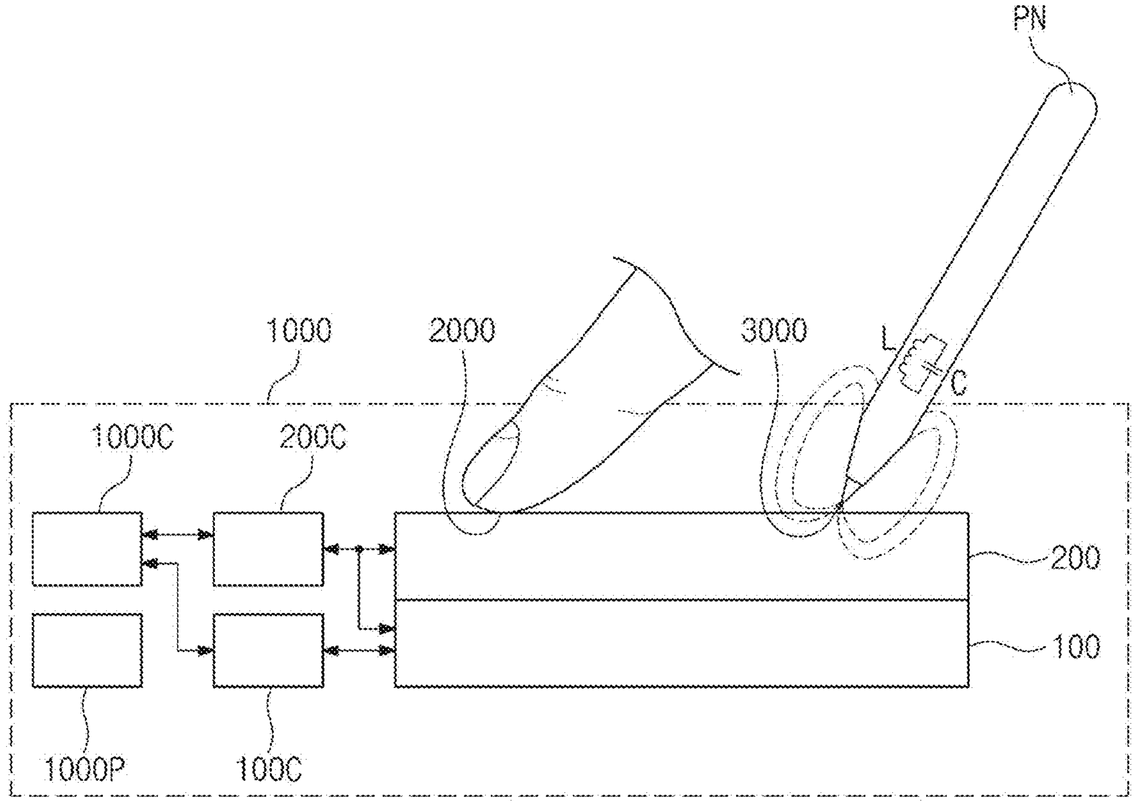
FIG. 3 is a view illustrating an operation of the electronic device according to an embodiment of the present disclosure.

FIG. 3 is a view illustrating an operation of the electronic device according to an embodiment of the present disclosure.

Referring to FIG. 3, the electronic device 1000 may include the display layer 100, the sensor layer 200, a display driver 100C, a sensor driver 200C, a main driver 1000C, and a power circuit 1000P.

The sensor layer 200 may sense a first input 2000 or a second input 3000 applied from the outside. Each of the first input 2000 and the second input 3000 may be an input by an input means capable of changing a capacitance of the sensor layer 200, or an input by an input means capable of causing an induced current in the sensor layer 200. For example, the first input 2000 may be an input by a passive input means, such as a part of the user's body. The second input 3000 may be an input by the pen PN, or an input by an RFIC tag. For example, the pen PN may be a pen of a passive kind or a pen of an active kind.

In an embodiment of the present disclosure, the pen PN may be a device that generates a magnetic field having a suitable resonant frequency (e.g., a predetermined resonant frequency). The pen PN may transmit an output signal based on a suitable electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the present disclosure, the RLC resonance circuit may be a variable resonance circuit that varies the resonant frequency. In this case, the inductor L may be a variable inductor, and/or the capacitor C may be a variable capacitor. However, the present disclosure is not particularly limited thereto.

The inductor L generates a current by a magnetic field formed in the sensor layer 200. However, the present disclosure is not particularly limited thereto. For example, when the pen PN operates as an active kind, the pen PN may generate a current even though a magnetic field is not provided to the pen PN from the outside. The generated current is transferred to the capacitor C. The capacitor C charges the current input from the inductor L, and discharges the charged current to the inductor L. Thereafter, the inductor L may emit a magnetic field having a suitable resonant frequency (e.g., a predetermined resonant frequency). An induced current may flow in the sensor layer 200 by the magnetic field emitted from the pen PN. The induced current may be transferred to the sensor driver 200C as a reception signal (e.g., a sensing signal or a signal).

The main driver 1000C may control the overall operations of the electronic device 1000. For example, the main driver 1000C may control operations of the display driver 100C and the sensor driver 200C. The main driver 1000C may include at least one microprocessor, and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various suitable signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determination signal for determining a driving mode of the sensor driver 200C and the sensor layer 200.

The sensor driver 200C may drive an auxiliary electrode disposed in the display layer 100. The sensor driver 200C may transmit a charging signal having a period (e.g., a predetermined period) to the auxiliary electrode of the display layer 100.

The sensor driver 200C may be implemented with an integrated circuit (IC), and may be electrically connected with the sensor layer 200. For example, the sensor driver 200C may be directly mounted on a suitable area (e.g., a predetermined area) of a display panel. As another example, the sensor driver 200C may be mounted on a separate printed circuit board using a chip on film (COF) method, and may be electrically connected with the sensor layer 200.

The sensor driver 200C and the sensor layer 200 may selectively operate in a first mode or a second mode. For example, the first mode may be a mode for sensing a touch input, for example, such as the first input 2000. The second mode may be a mode for sensing an input by the pen PN, for example, such as the second input 3000. The first mode may be referred to as a touch sensing mode, and the second mode may be referred to as a pen sensing mode.

Switching between the first mode and the second mode may be performed in various suitable ways. For example, the sensor driver 200C and the sensor layer 200 may be driven in the first mode and the second mode in a time-division manner, and may sense the first input 2000 and the second input 3000. As another example, the switching between the first mode and the second mode may be performed by the user's selection or the user's specific action. In another example, by activating or deactivating a specific application, one of the first mode or the second mode may be activated or deactivated, or the driving mode may be switched from one mode to the other mode. In another example, while the sensor driver 200C and the sensor layer 200 alternately operate in the first mode and the second mode, when the first input 2000 is sensed, the sensor driver 200C and the sensor layer 200 may remain in the first mode, and when the second input 3000 is sensed, the sensor driver 200C and the sensor layer 200 may remain in the second mode.

The sensor driver 200C may calculate coordinate information of an input based on a signal received from the sensor layer 200, and may provide a coordinate signal having the coordinate information to the main driver 1000C. The main driver 1000C executes an operation corresponding to the user input, based on the coordinate signal. For example, the main driver 1000C may operate the display driver 100C, such that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high-voltage, a gate low-voltage, a first driving voltage (e.g., an ELVSS voltage), a second driving voltage (e.g., an ELVDD voltage), an initialization voltage, and the like, but the present disclosure is not particularly limited thereto.

Figure 4:
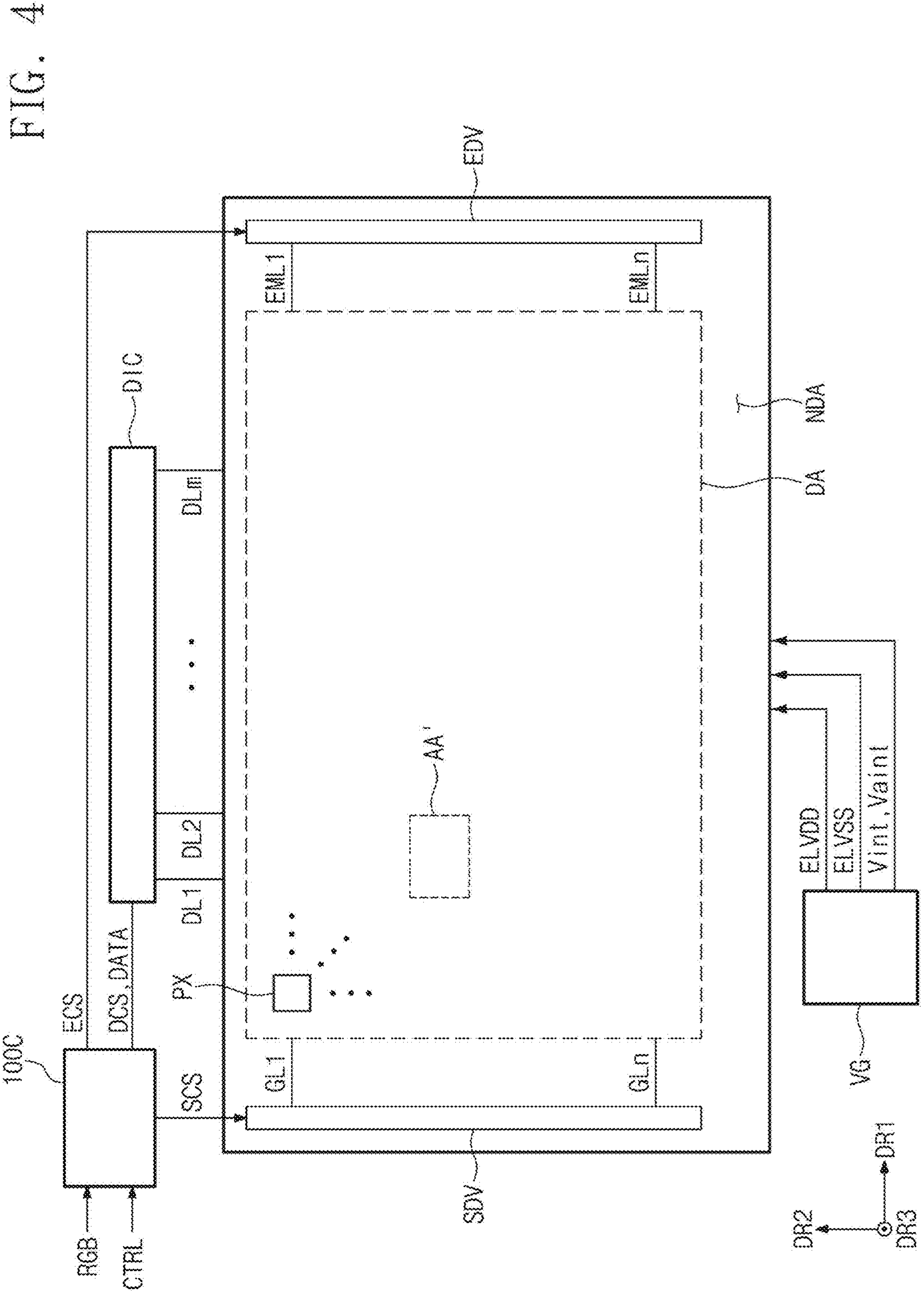
FIG. 4 is a block diagram of a part of the electronic device according to an embodiment of the present disclosure.

FIG. 4 is a block diagram of a part of the electronic device according to an embodiment of the present disclosure.

Referring to FIG. 4, the electronic device 1000 (e.g., refer to FIG. 1) may include the display layer 100, a panel driver, and the display driver 100C. In an embodiment of the present disclosure, the panel driver may include a data driver DIC, a scan driver SDV, a light emission driver EDV, and a voltage generator VG.

The display driver 100C may receive an image signal RGB and a control signal CTRL. The display driver 100C may generate image data DATA by converting a data format of the image signal RGB according to a specification of an interface with the data driver DIC. The display driver 100C may output a first control signal SCS, a second control signal ECS, and a third control signal DCS.

The data driver DIC may receive the third control signal DCS and the image data DATA from the display driver 100C. The data driver DIC may convert the image data DATA into data signals, and may output the data signals to a plurality of data lines DL1 to DLm described in more detail below. The data signals may be analog voltages corresponding to gray level values of the image data DATA.

The voltage generator VG may generate various suitable voltages used for an operation of the display layer 100. The voltage generator VG may generate a first driving voltage ELVDD, a second driving voltage ELVSS, a first initialization voltage Vint, a second initialization voltage Vaint, and a bias voltage Vbais.

A display area DA corresponding to the active area AA (e.g., refer to FIG. 1) and a non-display area NDA corresponding to the peripheral area NAA may be defined in the display layer 100.

The display layer 100 may include a plurality of pixels PX disposed in the display area DA, a plurality of scan lines GL1 to GLn, a plurality of light emission control lines EML1 to EMLn, and the plurality of data lines DL1 to DLm.

Each of the plurality of scan lines GL1 to GLn may extend in the first direction DR1. The plurality of scan lines GL1 to GLn may be spaced apart from one another in the second direction DR2.

Each of the plurality of light emission control lines EML1 to EMLn may extend in the first direction DR1. The plurality of light emission control lines EML1 to EMLn may be spaced apart from one another in the second direction DR2.

Each of the plurality of data lines DL1 to DLm may extend in the second direction DR2. The plurality of data lines DL1 to DLm may be spaced apart from one another in the first direction DR1. Here, "n" and "m" are natural numbers of 1 or more.

The plurality of pixels PX may be electrically connected to the plurality of scan lines GL1 to GLn, the plurality of light emission control lines EML1 to EMLn, and the plurality of data lines DL1 to DLm. For example, each of the plurality of pixels PX may be electrically connected to four scan lines. However, the present disclosure is not limited thereto, and the number of scan lines connected to each of the plurality of pixels PX may be variously modified as needed or desired.

The scan driver SDV may be disposed in the non-display area NDA. The scan driver SDV may receive the first control signal SCS from the display driver 100C. The scan driver SDV may output scan signals to the scan lines GL1 to GLn in response to the first control signal SCS.

The light emission driver EDV may be disposed in the non-display area NDA. The light emission driver EDV may be spaced apart from the scan driver SDV in the first direction DR1. The light emission driver EDV may receive the second control signal ECS from the display driver 100C. The light emission driver EDV may output light emission control signals to the light emission control lines EML1 to EMLn in response to the second control signal ECS. As another example, the light emission control lines EML1 to EMLn may be connected to the scan driver SDV. In this case, the light emission driver EDV may be omitted, and the scan driver SDV may output the light emission control signals to the light emission control lines EML1 to EMLn.

Figure 5:
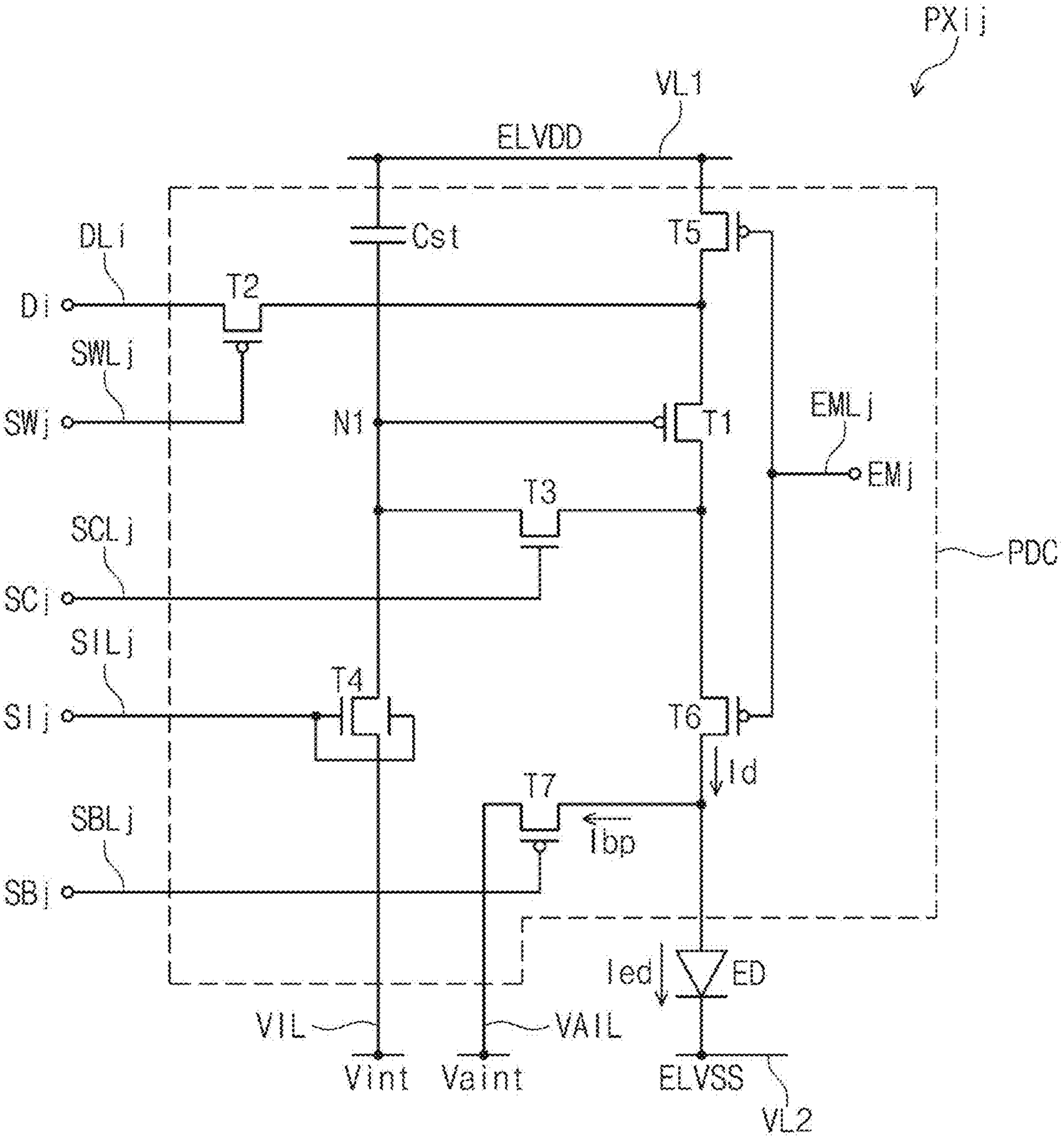
FIG. 5 is a circuit diagram illustrating a pixel according to an embodiment of the present disclosure.

FIG. 5 is a circuit diagram illustrating a pixel according to an embodiment of the present disclosure.

In FIG. 5, an equivalent circuit diagram of one pixel PXij from among the plurality of pixels PX illustrated in FIG. 4 is shown. Because the plurality of pixels PX have the same or substantially the same circuit structure as each other, the circuit structure of the pixel PXij described in more detail hereinafter may be applied to the other remaining pixels PX, and thus, redundant description thereof may not be repeated. The plurality of scan lines GL1 to GLn may include initialization scan lines SILj, compensation scan lines SCLj, write scan lines SWLj, and black scan lines SBLj.

Referring to FIG. 5, the pixel PXij may be connected to the i-th data line DLi among the data lines DL1 to DLm, the j-th initialization scan line SILj, the j-th compensation scan line SCLj, the j-th write scan line SWLj, and the j-th black scan line SBLj.

The pixel PXij may include a light emitting element ED and a pixel driving circuit PDC. The light emitting element ED may be a light emitting diode. In an embodiment of the present disclosure, the light emitting element ED may be an organic light emitting diode including an organic light emitting layer.

The pixel driving circuit PDC may include first to seventh transistors T1, T2, T3, T4, T5, T6, and T7 and one storage capacitor Cst. At least one of the first to seventh transistors T1 to T7 may be a transistor having a low-temperature polycrystalline silicon (LTPS) semiconductor layer. Some of the first to seventh transistors T1 to T7 may be P-type transistors, and the others may be N-type transistors. At least one of the first to seventh transistors T1 to T7 may be a transistor having an oxide semiconductor layer. For example, the third and fourth transistors T3 and T4 may be oxide semiconductor transistors, and the first, second, and fifth to seventh transistors T1, T2, and T5 to T7 may be LTPS transistors. The third and fourth transistors T3 and T4 may be NMOS transistors.

However, the present disclosure is not limited to the configuration of the pixel driving circuit PDC described above with reference to FIG. 5. In other words, the configuration of the pixel driving circuit PDC may be variously modified as needed or desired as would be understood by those having ordinary skill in the art. For example, the first, second, and fifth to seventh transistors T1, T2, and T5 to T7 may all be P-type transistors or N-type transistors.

The j-th initialization scan line SILj, the j-th compensation scan line SCLj, the j-th write scan line SWLj, the j-th black scan line SBLj, and the j-th light emission control line EMLj may transfer the j-th initialization scan signal SIj, the j-th compensation scan signal SCj, the j-th write scan signal SWj, the j-th black scan signal SBj, and the j-th light emission control signal EMj, respectively, to the pixel PXij. The i-th data line DLi transfers the i-th data signal Di to the pixel PXij.

In an embodiment of the present disclosure, the pixel PXij may be connected to first and second driving voltage lines VL1 and VL2 and first and second initialization voltage lines VIL and VAIL. The first driving voltage line VL1 may transfer the first driving voltage ELVDD to the pixel PXij, and the second driving voltage line VL2 may transfer the second driving voltage ELVSS to the pixel PXij. In addition, the first initialization voltage line VIL may transfer the first initialization voltage Vint to the pixel PXij, and the second initialization voltage line VAIL may transfer the second initialization voltage Vaint to the pixel PXij.

The first transistor T1 is connected between the first driving voltage line VL1, which receives the first driving voltage ELVDD, and the light emitting element ED. The first transistor T1 includes a first electrode connected with the first driving voltage line VL1 via the fifth transistor T5, a second electrode connected with an anode electrode of the light emitting element ED via the sixth transistor T6, and a third electrode (e.g., a gate electrode) connected with one end of the capacitor Cst (e.g., a first node N1). The first transistor T1 may receive the i-th data signal Di that the i-th data line DLi transfers depending on a switching operation of the second transistor T2, and may supply a driving current Id to the light emitting element ED.

The second transistor T2 is connected between the i-th data line DLi and the first electrode of the first transistor T1. The second transistor T2 includes a first electrode connected with the i-th data line DLi, a second electrode connected with the first electrode of the first transistor T1, and a third electrode (e.g., a gate electrode) connected with the j-th write scan line SWLj. The second transistor T2 may be turned on depending on the j-th write scan signal SWj transferred through the j-th write scan line SWLj, and may transfer, to the first electrode of the first transistor T1, the i-th data signal Di transferred from the i-th data line DLi.

The third transistor T3 is connected between the second electrode of the first transistor T1 and the first node N1. The third transistor T3 includes a first electrode connected with the third electrode of the first transistor T1, a second electrode connected with the second electrode of the first transistor T1, and a third electrode (e.g., a gate electrode) connected with the j-th compensation scan line SCLj. The third transistor T3 may be turned on depending on the j-th compensation scan signal SCj transferred through the j-th compensation scan line SCLj, and may diode-connect the first transistor T1 by connecting the third electrode and the second electrode of the first transistor T1 to each other.

The fourth transistor T4 is connected between the first initialization voltage line VIL to which the first initialization voltage Vint is applied and the first node N1. The fourth transistor T4 includes a first electrode connected with the first initialization voltage line VIL through which the first initialization voltage Vint is transferred, a second electrode connected with the first node N1, and a third electrode (e.g., a gate electrode) connected with the j-th initialization scan line SILj. The fourth transistor T4 is turned on depending on the j-th initialization scan signal SIj transferred through the j-th initialization scan line SILj. The turned-on fourth transistor T4 initializes the potential of the third electrode of the first transistor T1 (e.g., the potential of the first node N1) by transferring the first initialization voltage Vint to the first node N1.

The fifth transistor T5 includes a first electrode connected with the first driving voltage line VL1, a second electrode connected with the first electrode of the first transistor T1, and a third electrode (e.g., a gate electrode) connected to the j-th light emission control line EMLj.

The sixth transistor T6 includes a first electrode connected with the second electrode of the first transistor T1, a second electrode connected to the anode electrode of the light emitting element ED, and a third electrode (e.g., a gate electrode) connected to the j-th light emission control line EMLj.

The fifth and sixth transistors T5 and T6 are concurrently or substantially simultaneously turned on with each other depending on the j-th light emission control signal EMj transferred through the j-th light emission control line EMLj. The first driving voltage ELVDD applied through the turned-on fifth transistor T5 may be compensated for through the diode-connected first transistor T1, and thereafter, may be transferred to the light emitting element ED.

The seventh transistor T7 includes a first electrode connected to the second initialization voltage line VAIL through which the second initialization voltage Vaint is transferred, a second electrode connected with the second electrode of the sixth transistor T6, and a third electrode (e.g., a gate electrode) connected with the j-th black scan line SBLj. The second initialization voltage Vaint may have a voltage level lower than or equal to the voltage level of the first initialization voltage Vint.

The one end of the capacitor Cst is connected with the third electrode of the first transistor T1 as described above, and the opposite end of the capacitor Cst is connected with the first driving voltage line VL1. A cathode electrode of the light emitting element ED may be connected with the second driving voltage line VL2 that transfers the second driving voltage ELVSS. The second driving voltage ELVSS may have a lower voltage level than that of the first driving voltage ELVDD. In an embodiment of the present disclosure, the second driving voltage ELVSS may have a lower voltage level than those of the first and second initialization voltages Vint and Vaint.

When the pixel PXij displays a black image, the pixel PXij may not be able to normally display the black image, if the light emitting element ED emits light even though the minimum driving current of the first transistor T1 flows as the driving current Id. Accordingly, the seventh transistor T7 in the pixel PXij according to an embodiment of the present disclosure may distribute a portion of the minimum driving current of the first transistor T1 as a bypass current Ibp to a current path other than the current path toward the light emitting element ED. The minimum driving current of the first transistor T1 may refer to a current flowing to the first transistor T1 under the condition that the gate-source voltage Vgs of the first transistor T1 is lower than the threshold voltage Vth, so that the first transistor T1 is turned off. The minimum driving current (e.g., a current of 10 pA or less) flowing to the first transistor T1 under the condition that the first transistor T1 is turned off may be transferred to the light emitting element ED, and a black gray-scale image may be displayed. When the pixel PXij displays the black image, an influence of the bypass current Ibp on the minimum driving current may be relatively great, whereas when the pixel PXij displays an image such as a general image or a white image, the bypass current Ibp may have little influence on the driving current Id. Accordingly, when the pixel PXij displays the black image, the current obtained by subtracting the bypass current Ibp escaping through the seventh transistor T7 from the driving current Id (e.g., a light emission current led) may be provided to the light emitting element ED, so that the pixel PXij may clearly express the black image. Thus, the pixel PXij may implement a more accurate black gray-scale image using the seventh transistor T7, and as a result, a contrast ratio may be improved.

Figure 6:
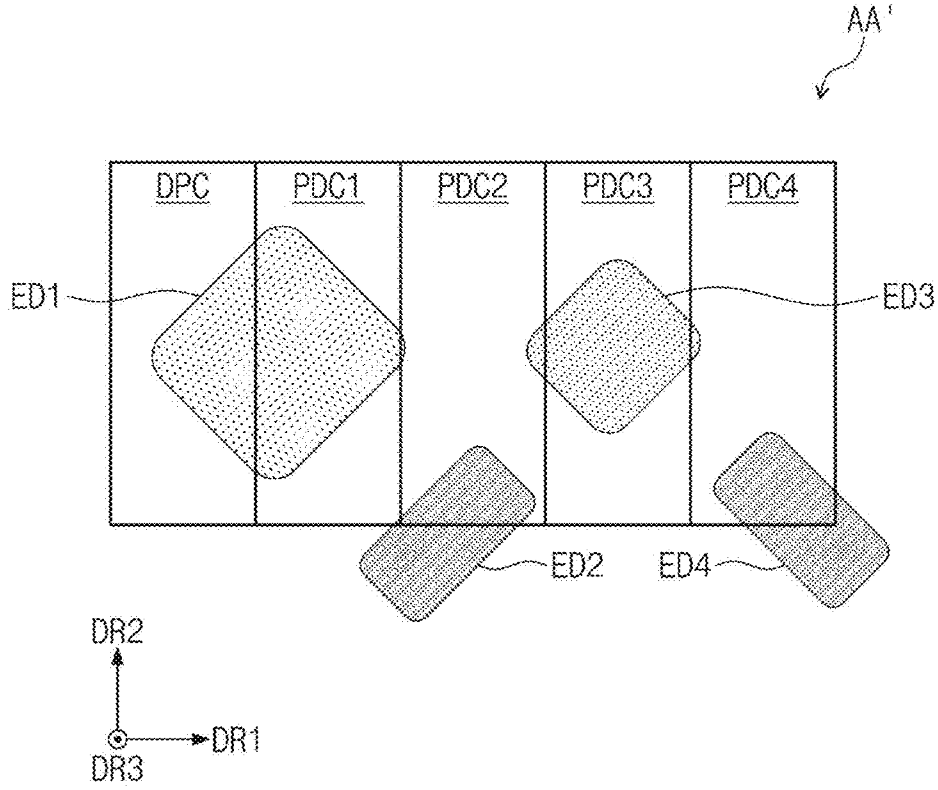
FIG. 6 is an enlarged view illustrating the area AA' of FIG. 4 according to an embodiment of the present disclosure.

FIG. 6 is an enlarged view illustrating area the AA' of FIG. 4 according to an embodiment of the present disclosure.

Referring to FIGS. 4 to 6, the circuit layer 120 may further include a dummy pixel circuit DPC disposed in the same layer as that of the pixel driving circuit PDC. The dummy pixel circuit DPC may have the same or substantially the same configuration as that of the pixel driving circuit PDC described above.

The pixel driving circuit PDC may include first to fourth pixel driving circuits PDC1 to PDC4.

The dummy pixel circuit DPC and the first to fourth pixel driving circuits PDC1 to PDC4 may be arranged along the first direction DR1. The dummy pixel circuit DPC and the first to fourth pixel driving circuits PDC1 to PDC4 may be arranged (e.g., may be repeatedly arranged) along the first direction DR1 and the second direction DR2 in the display area DA.

The light emitting element ED may include first to fourth light emitting elements ED1 to ED4.

The first light emitting element ED1 may emit a first light. For example, the first light may be blue light. The first light emitting element ED1 may be electrically connected with the first pixel driving circuit PDC1. The first light emitting element ED1 may overlap with the first pixel driving circuit PDC1 when viewed from above the plane (e.g., in a plan view).

The second light emitting element ED2 may emit a second light different from the first light. For example, the second light may be green light. The second light emitting element ED2 may be electrically connected with the second pixel driving circuit PDC2. The second light emitting element ED2 may overlap with the second pixel driving circuit PDC2 when viewed from above the plane (e.g., in a plan view).

The third light emitting element ED3 may emit a third light that is different from the first light and the second light. For example, the third light may be red light. The third light emitting element ED3 may be electrically connected with the third pixel driving circuit PDC3. The third light emitting element ED3 may overlap with the third pixel driving circuit PDC3 when viewed from above the plane (e.g., in a plan view).

The fourth light emitting element ED4 may emit the second light. The fourth light emitting element ED4 may be electrically connected with the fourth pixel driving circuit PDC4. The fourth light emitting element ED4 may overlap with the fourth pixel driving circuit PDC4 when viewed from above the plane (e.g., in a plan view).

The dummy pixel circuit DPC may not be connected with the light emitting element ED.

Figure 7:
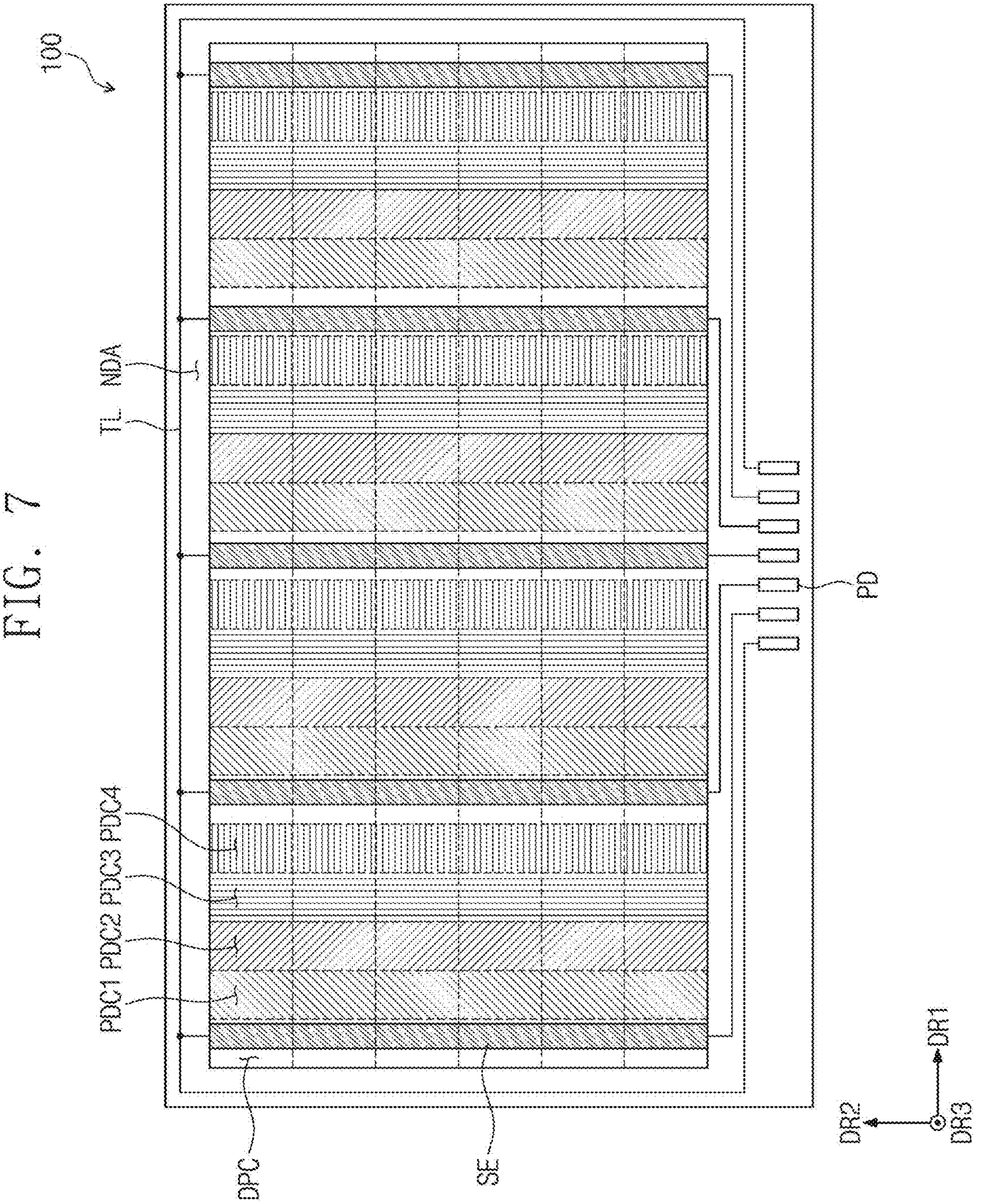
FIG. 7 is a plan view illustrating a portion of a display layer according to an embodiment of the present disclosure.

FIG. 7 is a plan view illustrating a portion of the display layer according to an embodiment of the present disclosure. In FIG. 7, the same or substantially the same components as those described above with reference to FIGS. 4 and 6 are denoted with the same reference symbols, and thus, redundant description thereof may not be repeated.

Referring to FIG. 7, the circuit layer 120 may include a plurality of first auxiliary electrodes SE that extend in the second direction DR2, and that are arranged along the first direction DR1. The plurality of first auxiliary electrodes SE may be electrically connected with one another.

The plurality of first auxiliary electrodes SE may be disposed in the display area DA.

A plurality of dummy pixel circuits DPC may be provided. When viewed from above the plane (e.g., in a plan view), the plurality of dummy pixel circuits DPC may overlap with the plurality of first auxiliary electrodes SE. The plurality of first auxiliary electrodes SE may be disposed over the dummy pixel circuits DPC.

The pixel driving circuits PDC1 to PDC4 may not overlap with the plurality of first auxiliary electrodes SE when viewed from above the plane (e.g., in a plan view).

The circuit layer 120 may further include a connecting line TL disposed in the non-display area NDA and connected with the plurality of first auxiliary electrodes SE, and a pad part PD connected with the connecting line TL. The connecting line TL may be connected with the plurality of first auxiliary electrodes SE. The plurality of first auxiliary electrodes SE may be electrically connected with one another by the connecting line TL.

The pad part PD may be connected with the sensor driver 200C (e.g., refer to FIG. 3). The sensor driver 200C (e.g., refer to FIG. 3) may provide a charging signal to the plurality of first auxiliary electrodes SE through the pad part PD.

Figure 8:
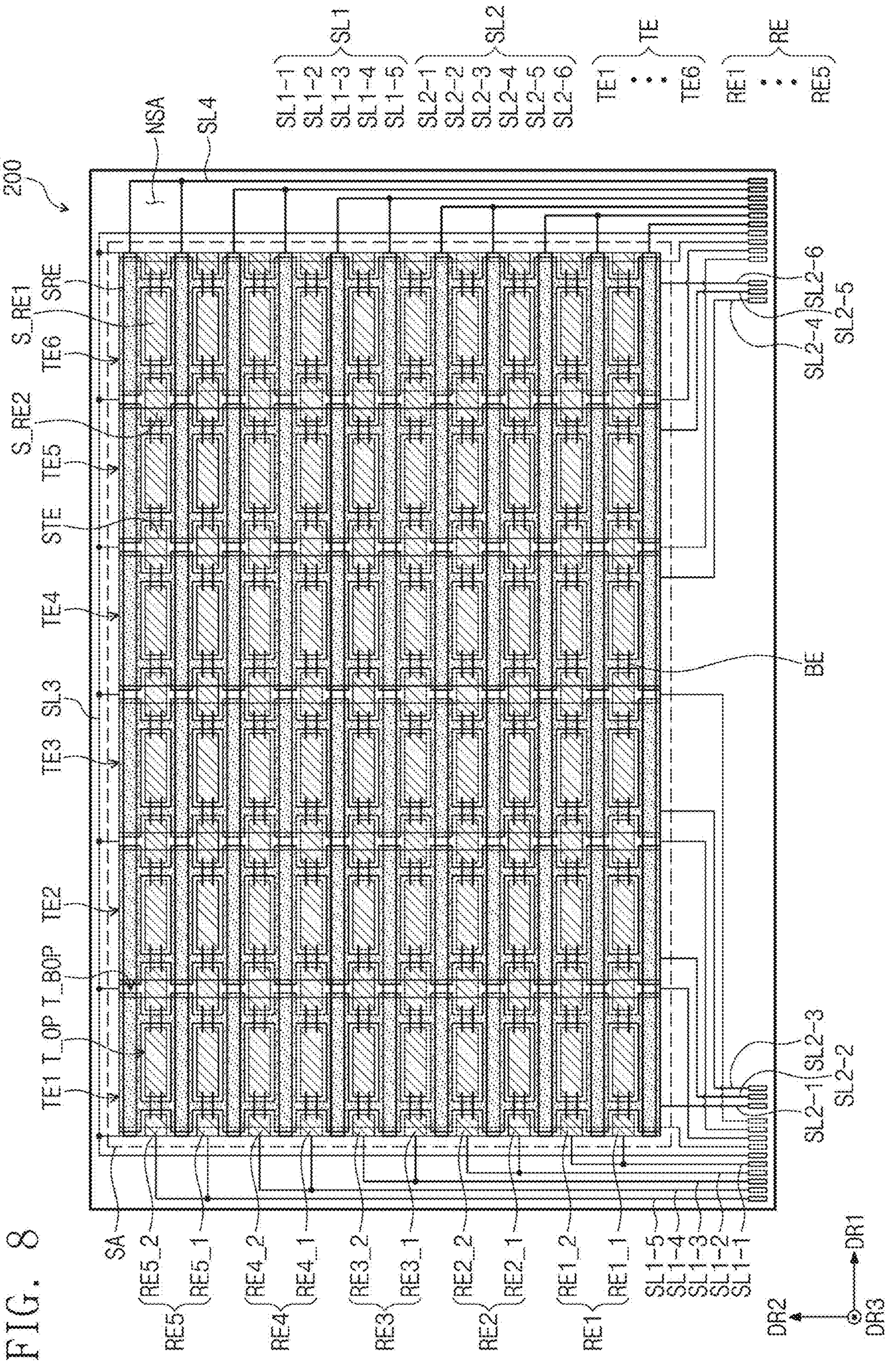
FIG. 8 is a plan view illustrating a sensor layer according to an embodiment of the present disclosure.

FIG. 8 is a plan view illustrating the sensor layer according to an embodiment of the present disclosure.

Referring to FIG. 8, a sensing area SA and a non-sensing area NSA adjacent to the sensing area SA may be defined in the sensor layer 200. The sensing area SA may correspond to the display area DA (e.g., refer to FIG. 4), and the non-sensing area NSA may correspond to the non-display area NDA. The sensing area SA may be an area that is activated depending on an electrical signal.

The sensor layer 200 may include a plurality of first electrodes TE and a plurality of second electrodes RE. The plurality of first electrodes TE may be arranged along the first direction DR1, and may extend in the second direction DR2. The plurality of second electrodes RE may be arranged along the second direction DR2, and may extend in the first direction DR1. The plurality of first electrodes TE and the plurality of second electrodes RE may be insulated from each other, and may cross each other.

The plurality of second electrodes RE may include first to fifth row sensing electrodes RE1 to RE5. Although FIG. 8 illustrates an example in which the number of second electrodes RE is five, the number of second electrodes RE is not limited thereto.

Each of the first to fifth row sensing electrodes RE1 to RE5 may include one or more sub-row sensing electrodes. Although FIG. 8 illustrates a structure in which each of the first to fifth row sensing electrodes RE1 to RE5 includes two sub-row sensing electrodes, the present disclosure is not limited thereto.

In an embodiment of the present disclosure, the first row sensing electrode RE1 may include first and second sub-row sensing electrodes RE1_1 and RE1_2, the second row sensing electrode RE2 may include third and fourth sub-row sensing electrodes RE2_1 and RE2_2, the third row sensing electrode RE3 may include fifth and sixth sub-row sensing electrodes RE3_1 and RE3_2, the fourth row sensing electrode RE4 may include seventh and eighth sub-row sensing electrodes RE4_1 and RE4_2, and the fifth row sensing electrode RE5 may include ninth and tenth sub-row sensing electrodes RE5_1 and RE5_2.

Each of the first to tenth sub-row sensing electrodes RE1_1 to RE5_2 may extend in the first direction DR1. The first to tenth sub-row sensing electrodes RE1_1 to RE5_2 may be spaced apart from one another in the second direction DR2. Each of the first to tenth sub-row sensing electrodes RE1_1 to RE5_2 includes a plurality of sub-sensing electrodes arranged along the first direction DR1. Each of the plurality of sub-sensing electrodes may have a quadrangular shape including two horizontal sides that are parallel to or substantially parallel to the first direction DR1, and two vertical sides that are parallel to or substantially parallel to the second direction DR2. Two sub-sensing electrodes that are adjacent to each other among the plurality of sub-sensing electrodes may be electrically connected with each other through a bridge electrode BE.

The plurality of first electrodes TE may include first to sixth column sensing electrodes TE1 to TE6. Although FIG. 8 illustrates an example in which the number of first electrodes TE is six, the number of first electrodes TE is not limited thereto.

Each of the first to sixth column sensing electrodes TE1 to TE6 may include an opening T_OP extending in the second direction DR2. A boundary opening T_BOP may be defined between two column sensing electrodes that are spaced apart from each other among the first to sixth column sensing electrodes TE1 to TE6.

In an embodiment of the present disclosure, the plurality of sub-sensing electrodes may be disposed to correspond to the opening T_OP and the boundary opening T_BOP. Hereinafter, from among the plurality of sub-sensing electrodes, a sub-sensing electrode disposed to correspond to the opening T_OP is referred to as a first sub-sensing electrode S_RE1, and a sub-sensing electrode disposed to correspond to the boundary opening T_BOP is referred to as a second sub-sensing electrode S_RE2. In an embodiment of the present disclosure, the first and second sub-sensing electrodes S_RE1 and S_RE2 may have different shapes or areas from each other. However, the present disclosure is not limited thereto. For example, the first and second sub-sensing electrodes S_RE1 and S_RE2 may have the same shape or area as each other.

The first and second sub-sensing electrodes S_RE1 and S_RE2 and the plurality of first electrodes TE may be disposed in the same layer as each other. The first and second sub-sensing electrodes S_RE1 and S_RE2 may be disposed in a different layer from that of the bridge electrode BE.

The sensor layer 200 may obtain information about a user input through a change in the mutual capacitance between the plurality of first electrodes TE and the plurality of second electrodes RE.

The sensor layer 200 may further include a plurality of second auxiliary electrodes STE and a plurality of third auxiliary electrodes SRE.

The plurality of second auxiliary electrodes STE may be arranged along the first direction DR1, and each of the plurality of second auxiliary electrodes STE may extend in the second direction DR2.

The plurality of second auxiliary electrodes STE may be disposed in a layer different from the layer in which the second sub-sensing electrode S_RE2 is disposed. The plurality of second auxiliary electrodes STE and the second sub-sensing electrode S_RE2 may overlap with each other when viewed from above the plane (e.g., in a plan view).

The plurality of third auxiliary electrodes SRE may be arranged along the second direction DR2, and each of the plurality of third auxiliary electrodes SRE may extend in the first direction DR1.

The plurality of third auxiliary electrodes SRE may be disposed in a layer different from the layer in which the plurality of first electrodes TE are disposed. The plurality of third auxiliary electrodes SRE and the plurality of first electrodes TE may overlap with each other when viewed from above the plane (e.g., in a plan view).

The plurality of second auxiliary electrodes STE according to an embodiment of the present disclosure may be omitted. In this case, the plurality of first auxiliary electrodes SE disposed in the display layer 100 (e.g., refer to FIG. 7) may replace the plurality of second auxiliary electrodes STE.

The sensor layer 200 may further include first trace lines SL1 electrically connected with the plurality of second electrodes RE, and second trace lines SL2 electrically connected with the plurality of first electrodes TE. The first trace lines SL1 and the second trace lines SL2 may be disposed in the non-sensing area NSA.

A change in the mutual capacitance between the first electrodes TE and the second electrodes RE may occur at the position where a user input is provided. The sensor driver 200C (e.g., refer to FIG. 3) may generate the coordinates of the position where the user input is provided, based on a reception signal received from the first trace lines SL1.

Each of the first to fifth row sensing electrodes RE1 to RE5 is connected with one or more first trace lines SL1. In an embodiment of the present disclosure, each of the first to fifth row sensing electrodes RE1 to RE5 is connected with one first trace line SL1. The first trace lines SL1 may include a first-first trace line SL1-1, a first-second trace line SL1-2, a first-third trace line SL1-3, a first-fourth trace line SL1-4, and a first-fifth trace line SL1-5 that are connected to the first to fifth row sensing electrodes RE1 to RE5, respectively. The first-first to first-fifth trace lines SL1-1 to SL1-5 may be disposed in the non-sensing area NSA, and may be connected to respective pads.

Each of the first to sixth column sensing electrodes TE1 to TE6 is connected with one second trace line SL2. In an embodiment of the present disclosure, the second trace lines SL2 include a second-first trace line SL2-1, a second-second trace line SL2-2, a second-third trace line SL2-3, a second-fourth trace line SL2-4, a second-fifth trace line SL2-5, and a second-sixth trace line SL2-6 that are connected to the first to sixth column sensing electrodes TE1 to TE6, respectively. The second-first to second-sixth trace lines SL2-1 to SL2-6 may be disposed in the non-sensing area NSA, and may be connected to respective pads.

The sensor layer 200 may further include third trace lines SL3 electrically connected with the plurality of second auxiliary electrodes STE, and fourth trace lines SL4 electrically connected with the plurality of third auxiliary electrodes SRE.

At the position where an input of the pen PN (e.g., refer to FIG. 3) is provided, the sensor driver 200C may generate the coordinates of the position where the input of the pen PN is provided, based on signals received from the second auxiliary electrodes STE and the third auxiliary electrodes SRE.

The plurality of second auxiliary electrodes STE may be connected to respective pads through the third trace lines SL3. The third trace lines SL3 may be disposed in the non-sensing area NSA.

The plurality of third auxiliary electrodes SRE may be connected to respective pads through the fourth trace lines SL4. The fourth trace lines SL4 may be disposed in the non-sensing area NSA.

Each of the plurality of first electrodes TE, the plurality of second electrodes RE, the plurality of second auxiliary electrodes STE, and the plurality of third auxiliary electrodes SRE may include a plurality of mesh lines crossing one another, and may have a mesh shape in which openings are defined by the plurality of mesh lines. The openings may correspond to the emissive areas of the pixels PX included in the display layer 100.

The sides that define the plurality of first electrodes TE, the plurality of second electrodes RE, the plurality of second auxiliary electrodes STE, and the plurality of third auxiliary electrodes SRE may be disposed to be parallel to or substantially parallel to the first and second directions DR1 and DR2. Accordingly, when the pen PN (e.g., refer to FIG. 3) moves in the first direction DR1 or the second direction DR2, the capacitance may remain constant or substantially constant without being changed, and thus, the position and slope of the pen PN may be accurately sensed.

Figure 9:
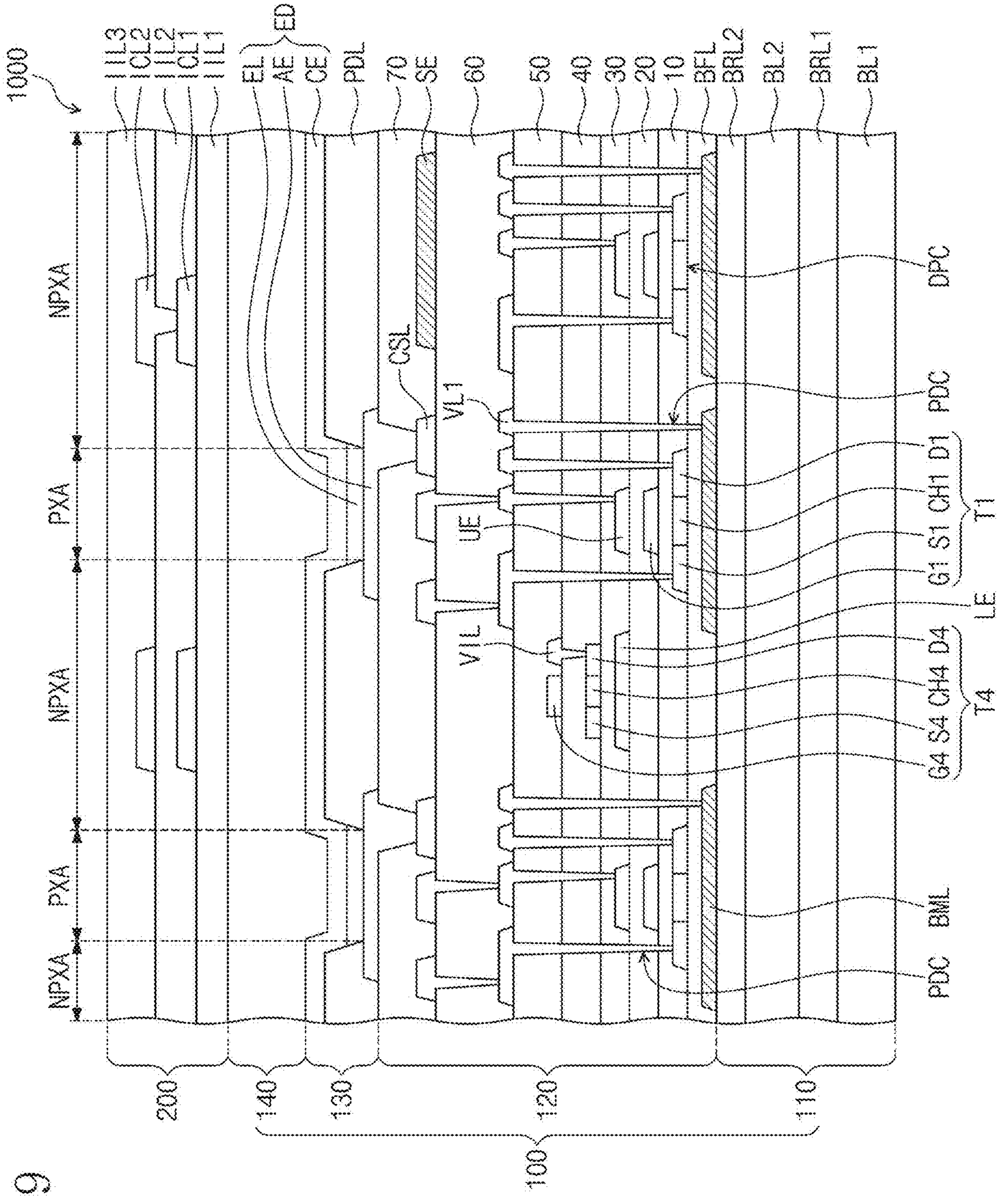
FIG. 9 is a sectional view of the electronic device according to an embodiment of the present disclosure.

FIG. 9 is a sectional view of the electronic device according to an embodiment of the present disclosure.

Referring to FIGS. 5, 8, and 9, the electronic device 1000 may include the display layer 100 and the sensor layer 200.

The display layer 100 may include the base layer 110, the circuit layer 120, the light emitting element layer 130, and the encapsulation layer 140.

The base layer 110 may include a first base layer BL1, a first barrier layer BRL1, a second base layer BL2, and a second barrier layer BRL2, which are sequentially stacked one above another.

The first base layer BL1 and the second base layer BL2 may include a synthetic resin layer. The synthetic resin layer may include a thermosetting resin. In more detail, the synthetic resin layer may be a polyimide-based resin layer, but the material thereof is not particularly limited thereto. The synthetic resin layer may include at least one of an acrylic resin, a methacrylic resin, a polyisoprene resin, a vinyl resin, an epoxy resin, a urethane-based resin, a cellulosic resin, a siloxane-based resin, a polyamide resin, or a perylene-based resin. In addition, the base layer may include a glass substrate, a metal substrate, or an organic/inorganic composite substrate.

The first barrier layer BRL1 and the second barrier layer BRL2 may be formed on the upper surfaces of the first base layer BL1 and the second base layer BL2, respectively. The first barrier layer BRL1 and the second barrier layer BRL2 may include at least one inorganic layer. The inorganic layer may include at least one of aluminum oxide, titanium oxide, silicon oxide, silicon oxy nitride, zirconium oxide, or hafnium oxide. The inorganic layer may be formed of multiple layers.

The first barrier layer BRL1 and the second barrier layer BRL2 may prevent or substantially prevent infiltration of foreign matter from the outside. The first barrier layer BRL1 and the second barrier layer BRL2 may include a silicon oxide layer and a silicon nitride layer. A plurality of silicon oxide layers and a plurality of silicon nitride layers may be provided. The silicon oxide layers and the silicon nitride layers may be alternately stacked one above another.

The circuit layer 120 may be formed on the base layer 110. The circuit layer 120 may include a lower metal layer BML, a buffer layer BFL, first to seventh insulating layers 10 to 70, a plurality of pixel driving circuits PDC, and a dummy pixel circuit DPC.

The lower metal layer BML may be disposed on the second barrier layer BRL2. The lower metal layer BML may overlap with the first transistor T1 when viewed from above the plane (e.g., in a plan view). The lower metal layer BML may block external light from reaching the first transistor T1. A constant voltage or signal may be applied to the lower metal layer BML to prevent or substantially prevent damage to the pixel driving circuits PDC due to an electrostatic discharge.

The lower metal layer BML may include a reflective metal. For example, the lower metal layer BML may include titanium (TI), molybdenum (Mo), an alloy containing molybdenum, aluminum (Al), an alloy containing aluminum, aluminum nitride (AlN), tungsten (W), tungsten nitride, and/or copper (Cu).

The buffer layer BFL may be disposed on the second barrier layer BRL2. The buffer layer BFL may cover the lower metal layer BML. The buffer layer BFL improves the coupling force between the base layer 110 and a semiconductor pattern and/or a conductive pattern. The buffer layer BFL may include silicon oxide layers and silicon nitride layers. The silicon oxide layers and the silicon nitride layers may be alternately stacked one above another.

The semiconductor pattern is disposed on the buffer layer BFL. Hereinafter, the semiconductor pattern that is directly disposed on the buffer layer BFL is defined as a first semiconductor pattern. The first semiconductor pattern may include a silicon semiconductor. The first semiconductor pattern may include poly silicon. However, the present disclosure is not limited thereto, and the first semiconductor pattern may include amorphous silicon.

The first semiconductor pattern has different electrical properties depending on whether doping is performed or not. The first semiconductor pattern may include doped areas and a non-doped area. The doped areas may be doped with an N-type dopant or a P-type dopant. A P-type transistor includes a doped area doped with a P-type dopant, and an N-type transistor includes a doped area doped with an N-type dopant.

The doped areas may have a higher conductivity than that of the non-doped area, and may substantially serve as electrodes or signal lines. The non-doped area substantially corresponds to an active area (e.g., a channel) of a transistor. In other words, one portion of the first semiconductor pattern may be the active area of the transistor, another portion may be a source or drain of the transistor, and another portion may be a connecting signal line (e.g., a connecting electrode).

The first electrode S1, the channel part CH1, and the second electrode D1 of the first transistor T1 are formed from the first semiconductor pattern. The first electrode S1 and the second electrode D1 of the first transistor T1 extend from the channel part CH1 in opposite directions from each other.

The first insulating layer 10 is disposed on the buffer layer BFL. The first insulating layer 10 commonly overlaps with the plurality of pixels PX (e.g., refer to FIG. 3), and covers the first semiconductor pattern. The first insulating layer 10 may be an inorganic layer and/or an organic layer, and may have a single-layer structure or a multi-layered structure. The first insulating layer 10 may include at least one of aluminum oxide, titanium oxide, silicon oxide, silicon oxy nitride, zirconium oxide, or hafnium oxide. In an embodiment, the first insulating layer 10 may be a single silicon oxide layer. Not only the first insulating layer 10, but also the insulating layers of the circuit layer 120 described in more detail below, may be inorganic layers and/or organic layers, and may have a single-layer structure or a multi-layered structure. The inorganic layers may include at least one of the aforementioned inorganic materials.

The gate electrode G1 of the first transistor T1 is disposed on the first insulating layer 10. The gate electrode G1 of the first transistor T1 overlaps with the channel part CH1 of the first transistor T1. The gate electrode G1 of the first transistor T1 may serve as a mask in a process of doping the first semiconductor pattern.

An upper electrode UE and a lower electrode LE may be disposed on the second insulating layer 20. The upper electrode UE may overlap with the gate electrode G1. The lower electrode LE may overlap with a second semiconductor pattern of the fourth transistor T4 described in more detail below. The lower electrode LE may be referred to as a bottom gate of the fourth transistor T4. A portion of the gate electrode G1 and the upper electrode UE overlapping with the portion of the gate electrode G1 may define the capacitor Cst (e.g., refer to FIG. 5). In an embodiment of the present disclosure, the upper electrode UE may be omitted as needed or desired. Although FIG. 9 illustrates a structure in which the lower electrode LE and the upper electrode UE are disposed at (e.g., in or on) the same layer as each other, the present disclosure is not limited thereto. As another example, the gate electrode G1 of the first transistor T1 and the lower electrode LE may be disposed at (e.g., in or on) the same layer as each other.

In an embodiment of the present disclosure, the second insulating layer 20 may be replaced with an insulating pattern. The upper electrode UE and the lower electrode LE may be disposed on the insulating pattern. The upper electrode UE and the lower electrode LE may serve as a mask that forms the insulating pattern from the second insulating layer 20.

The third insulating layer 30 is disposed on the second insulating layer 20 to cover the upper electrode UE and the lower electrode LE. In an embodiment, the third insulating layer 30 may be a single silicon oxide layer. A semiconductor pattern is disposed on the third insulating layer 30. Hereinafter, the semiconductor pattern that is directly disposed on the third insulating layer 30 is defined as the second semiconductor pattern. The second semiconductor pattern may include a metal oxide. The oxide semiconductor may include a crystalline or amorphous oxide semiconductor. For example, the oxide semiconductor may include a metal oxide of zinc (Zn), indium (In), gallium (Ga), tin (Sn), or titanium (Ti). As another example, the oxide semiconductor may include a mixture of a metal, such as zinc (Zn), indium (In), gallium (Ga), tin (Sn), or titanium (Ti), and an oxide thereof. The oxide semiconductor may include indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), or zinc-tin oxide (ZTO).

The second semiconductor pattern may include a plurality of areas distinguished from one another depending on whether or not the metal oxide is reduced or not. Areas where the metal oxide is reduced (hereinafter, referred to as the reduced areas) have a higher conductivity than that of an area where the metal oxide is not reduced (hereinafter, referred to as the non-reduced area). The reduced areas substantially serve as electrodes or signal lines. The non-reduced area substantially corresponds to a channel part of a transistor. In other words, one portion of the second semiconductor pattern may be the channel part of the transistor, and another portion may be a first electrode or a second electrode of the transistor.

The first electrode S4, the channel part CH4, and the second electrode D4 of the fourth transistor T4 are formed from the second semiconductor pattern. In an embodiment of the present disclosure, the second semiconductor pattern may include a metal oxide. The first electrode S4 and the second electrode D4 include a metal reduced from a metal oxide semiconductor. The first electrode S4 and the second electrode D4 may include a metal layer that has a suitable thickness (e.g., a predetermined thickness) from the upper surface of the second semiconductor pattern, and includes the reduced metal.

The fourth insulating layer 40 is disposed to cover the first electrode S4, the channel part CH4, and the second electrode D4 of the fourth transistor T4. The gate electrode G4 of the fourth transistor T4 is disposed on the fourth insulating layer 40. The gate electrode G4 of the fourth transistor T4 may be referred to as a top gate. The gate electrode G4 of the fourth transistor T4 overlaps with the channel part CH4 of the fourth transistor T4.

The gate electrode G4 of the fourth transistor T4 may be the same or substantially the same as the initialization scan line SILj.

The gate electrode G4 of the fourth transistor T4 may overlap with the lower electrode LE when viewed from above the plane (e.g., in a plan view), and may be connected with the lower electrode LE through a contact hole penetrating the third and fourth insulating layers 30 and 40. In other words, the gate electrode G4 of the fourth transistor T4 may be electrically connected with the lower electrode LE.

The first initialization voltage line VIL may be disposed on the fourth insulating layer 40. The first initialization voltage line VIL may be disposed at (e.g., in or on) the same layer as that of the gate electrode G4 of the fourth transistor T4. For example, the first initialization voltage line VIL may be disposed in the same layer as that of the initialization scan line SILj.

The fifth insulating layer 50 is disposed on the fourth insulating layer 40 to cover the gate electrode G4 of the fourth transistor T4. In an embodiment, the fifth insulating layer 50 may include a silicon oxide layer and a silicon nitride layer. The fifth insulating layer 50 may include a plurality of silicon oxide layers and a plurality of silicon nitride layers alternately stacked one above another.

The first driving voltage line VL1 may be disposed on the fifth insulating layer 50. The first driving voltage line VL1 may be connected to the lower metal layer BML through a contact hole. The first driving voltage ELVDD may be provided to the lower metal layer BML. However, the present disclosure is not limited thereto, and a connection relationship of the lower metal layer BML according to an embodiment of the present disclosure is not limited thereto. For example, the lower metal layer BML may be connected with the gate electrode G1 of the first transistor T1. As another example, the lower metal layer BML may be provided in a form isolated from other conductive patterns. The lower metal layer BML according to an embodiment of the present disclosure may be provided in various suitable forms, and is not limited to any particular embodiment.

At least one insulating layer is additionally disposed on the fifth insulating layer 50. In an embodiment, the sixth insulating layer 60 may be disposed on the fifth insulating layer 50. The sixth insulating layer 60 may be an organic layer, and may have a single-layer structure or a multi-layered structure. The sixth insulating layer 60 may be a single polyimide-based resin layer. However, the present disclosure is not limited thereto, and the sixth insulating layer 60 may include at least one of an acrylic resin, a methacrylic resin, a polyisoprene resin, a vinyl resin, an epoxy resin, a urethane-based resin, a celluosic resin, a siloxane-based resin, a polyamide resin, or a perylene-based resin.

A connecting signal line CSL may be disposed on the sixth insulating layer 60. In another view, the connecting signal line CSL may be connected to the second electrode of the sixth transistor T6 (e.g., refer to FIG. 5A) through a contact hole when viewed from above the plane (e.g., in a plan view).

The plurality of first auxiliary electrodes SE may be disposed on the sixth insulating layer 60. The plurality of first auxiliary electrodes SE may be disposed over the dummy pixel circuits DPC. The dummy pixel circuits DPC may overlap with the plurality of first auxiliary electrodes SE when viewed from above the plane (e.g., in a plan view).

According to some embodiments of the present disclosure, the dummy pixel circuit DPC may not be connected with the light emitting element ED, and thus, a space in which the plurality of first auxiliary electrodes SE are to be disposed may be provided over the sixth insulating layer 60. The sensor driver 200C may transmit a charging signal having a period (e.g., a predetermined period) to the plurality of first auxiliary electrodes SE. The pen PN (e.g., refer to FIG. 3) may be charged based on the charging signal. Accordingly, the electronic device 1000 capable of sensing the pen PN (e.g., refer to FIG. 3) may be provided.

The pixel driving circuit PDC may not overlap with the plurality of first auxiliary electrodes SE when viewed from above the plane (e.g., in a plan view).

The seventh insulating layer 70 may be disposed on the sixth insulating layer 60 to cover the plurality of first auxiliary electrodes SE.

The light emitting element layer 130 may be disposed on the circuit layer 120. The light emitting element layer 130 may include the light emitting element ED. The light emitting element ED may include a first electrode AE, an emissive layer EL, and a second electrode CE. The first electrode AE may be referred to as an anode electrode AE. The second electrode CE may be referred to as a cathode electrode CE or a common electrode CE.

The first electrode AE may be connected to the connecting signal line CSL through a contact hole penetrating the seventh insulating layer 70.

The light emitting element layer 130 may further include a pixel defining layer PDL. The pixel defining layer PDL may include an opening defined therein to correspond to the light emitting element ED. The opening may expose at least a portion of the anode electrode AE of the light emitting element ED. The opening of the pixel defining layer PDL may define an emissive area PXA. For example, the plurality of pixels PX (e.g., refer to FIG. 4) may be arranged according to a predetermined rule on the plane of the display panel DP (e.g., refer to FIG. 3). Areas where the plurality of pixels PX are disposed may be defined as pixel areas, and one pixel area may include an emissive area PXA and a non-emissive area NPXA adjacent to the emissive area PXA. The non-emissive area NPXA may surround (e.g., around a periphery of) the emissive area PXA.

The emissive layer EL is disposed to correspond to the opening defined in the pixel defining layer PDL. In other words, the emissive layer EL may be separately formed in each of the pixels. When the emissive layer EL is separately formed in each of the pixels, the emissive layers EL may each emit at least one of a blue light, a red light, or a green light.

Although the patterned emissive layer EL is illustrated in FIG. 9, the present disclosure is not limited thereto. As another example, a common emissive layer may be commonly disposed in the plurality of pixels PX. In this case, the common emissive layer may generate a white light or a blue light. The second electrode CE may be disposed on the emissive layer EL. The second electrode CE is commonly disposed in the plurality of pixels PX.

In an embodiment of the present disclosure, a hole control layer may be disposed between the first electrode AE and the emissive layer EL. The hole control layer may be commonly disposed in the emissive area PXA and the non-emissive area NPXA. The hole control layer may include a hole transport layer, and may further include a hole injection layer. An electron control layer may be disposed between the emissive layer EL and the second electrode CE. The electron control layer may include an electron transport layer, and may further include an electron injection layer. The hole control layer and the electron control layer may be commonly formed in the plurality of pixels using an open mask or an ink-jet process.

The encapsulation layer 140 may be disposed on the light emitting element layer 130. The encapsulation layer 140 may include an inorganic layer, an organic layer, and an inorganic layer, which are sequentially stacked one above another. However, the layers constituting the encapsulation layer 140 are not limited thereto. The inorganic layers may protect the light emitting element layer 130 from moisture and oxygen, and the organic layer may protect the light emitting element layer 130 from foreign matter such as dust particles. The inorganic layers may include a silicon nitride layer, a silicon oxy nitride layer, a silicon oxide layer, a titanium oxide layer, or an aluminum oxide layer. The organic layer may include an acrylic organic layer, but the present disclosure is not limited thereto.

The sensor layer 200 may include a base layer IIL1, a first conductive layer ICL1, an intermediate insulating layer IIL2, a second conductive layer ICL2, and a cover insulating layer IIL3.

The base layer IIL1 may be an inorganic layer including at least one of silicon nitride, silicon oxy nitride, or silicon oxide. As another example, the base layer IIL1 may be an organic layer including an epoxy resin, an acrylic resin, or an imide-based resin. The base layer IIL1 may have a single-layer structure, or may have a multi-layered structure stacked in the third direction DR3.

The first conductive layer ICL1 may include the plurality of second auxiliary electrodes STE, the plurality of third auxiliary electrodes SRE, and the bridge electrode BE.

The second conductive layer ICL2 may include the plurality of first electrodes TE and the plurality of sub-sensing electrodes.

The plurality of second auxiliary electrodes STE, the plurality of third auxiliary electrodes SRE, the plurality of first electrodes TE, and the plurality of second electrodes RE may overlap with the non-emissive area NPXA when viewed from above the plane (e.g., in a plan view).

A portion of the first conductive layer ICL1 may be connected with the second conductive layer ICL2 through a contact.

Each of the first conductive layer ICL1 and the second conductive layer ICL2 may have a single-layer structure, or may have a multi-layered structure stacked in the third direction DR3.

Each of the first conductive layer ICL1 and the second conductive layer ICL2 that have a single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), indium zinc tin oxide (IZTO), or the like. In addition, the transparent conductive layer may include a conductive polymer, such as poly(3,4-ethylenedioxythiophene) (PEDOT), a metal nano wire, or graphene.

Each of the first conductive layer ICL1 and the second conductive layer ICL2 that have a multi-layered structure may include a plurality of metal layers. The meal layers may have, for example, a three-layered structure of titanium/aluminum/titanium. The conductive layer having the multi-layered structure may include at least one metal layer and at least one transparent conductive layer.

At least one of the intermediate insulating layer IIL2 or the cover insulating layer IIL3 may include an inorganic film. The inorganic film may include at least one of aluminum oxide, titanium oxide, silicon oxide, silicon nitride, silicon oxy nitride, zirconium oxide, or hafnium oxide.

At least one of the intermediate insulating layer IIL2 or the cover insulating layer IIL3 may include an organic film. The organic film may include at least one of an acrylic resin, a methacrylic resin, a polyisoprene resin, a vinyl resin, an epoxy resin, a urethane-based resin, a celluosic resin, a siloxane-based resin, a polyimide resin, a polyamide resin, or a perylene-based resin.

Figure 10:
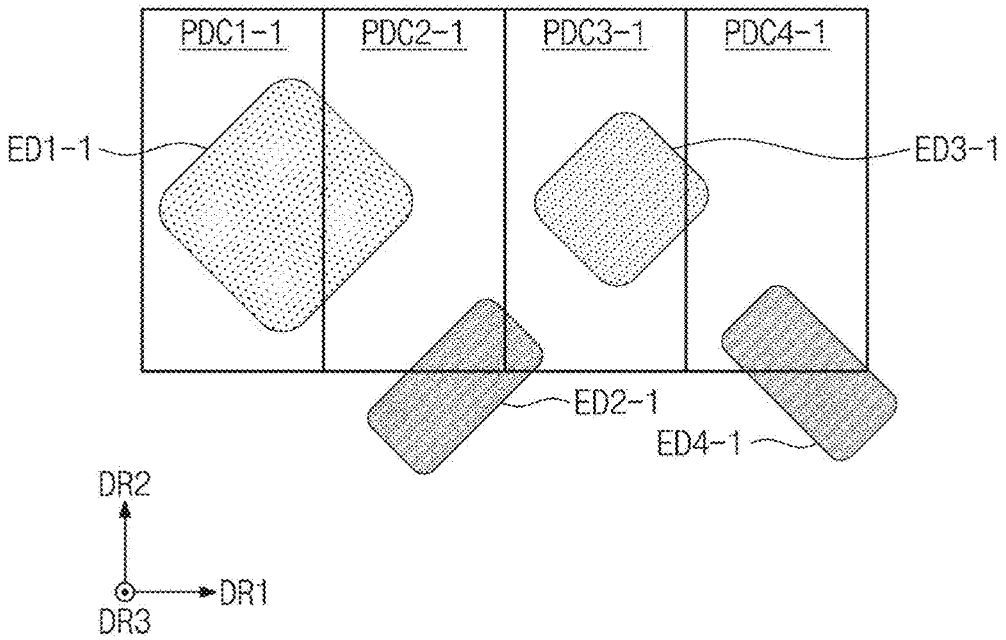
FIG. 10 is an enlarged plan view illustrating the area AA' of FIG. 4 according to an embodiment of the present disclosure.

FIG. 10 is an enlarged plan view illustrating the area AA' of FIG. 4 according to an embodiment of the present disclosure.

Referring to FIGS. 5 and 10, the pixel driving circuit PDC may include first to fourth pixel driving circuits PDC1-1 to PDC4-1.

The first to fourth pixel driving circuits PDC1-1 to PDC4-1 may be arranged along the first direction DR1. The first to fourth pixel driving circuits PDC1-1 to PDC4-1 may be arranged along the first direction DR1 and the second direction DR2 in the display area DA (e.g., refer to FIG. 4).

The light emitting element ED may include first to fourth light emitting elements ED1-1 to ED4-1.

The first light emitting element ED1-1 may emit the first light. For example, the first light may be a blue light. The first light emitting element ED1-1 may be electrically connected with the first pixel driving circuit PDC1-1. The first light emitting element ED1-1 may overlap with the first pixel driving circuit PDC1-1 when viewed from above the plane (e.g., in a plan view).

The second light emitting element ED2-1 may emit the second light different from the first light. For example, the second light may be a green light. The second light emitting element ED2-1 may be electrically connected with the second pixel driving circuit PDC2-1. The second light emitting element ED2-1 may overlap with the second pixel driving circuit PDC2-1 when viewed from above the plane (e.g., in a plan view).

The third light emitting element ED3-1 may emit the third light that is different from the first light and the second light. For example, the third light may be a red light. The third light emitting element ED3-1 may be electrically connected with the third pixel driving circuit PDC3-1. The third light emitting element ED3-1 may overlap with the third pixel driving circuit PDC3-1 when viewed from above the plane (e.g., in a plan view).

The fourth light emitting element ED4-1 may emit the second light. The fourth light emitting element ED4-1 may be electrically connected with the fourth pixel driving circuit PDC4-1. The fourth light emitting element ED4-1 may overlap with the fourth pixel driving circuit PDC4-1 when viewed from above the plane (e.g., in a plan view).

The configuration illustrated in FIG. 10 may correspond to a configuration in which the dummy pixel circuit DPC is omitted from FIG. 4. In other words, the dummy pixel circuit DPC (e.g., refer to FIG. 6) may be omitted from the display layer 100 (e.g., refer to FIG. 4) according to an embodiment of the present disclosure.

Figure 11A:
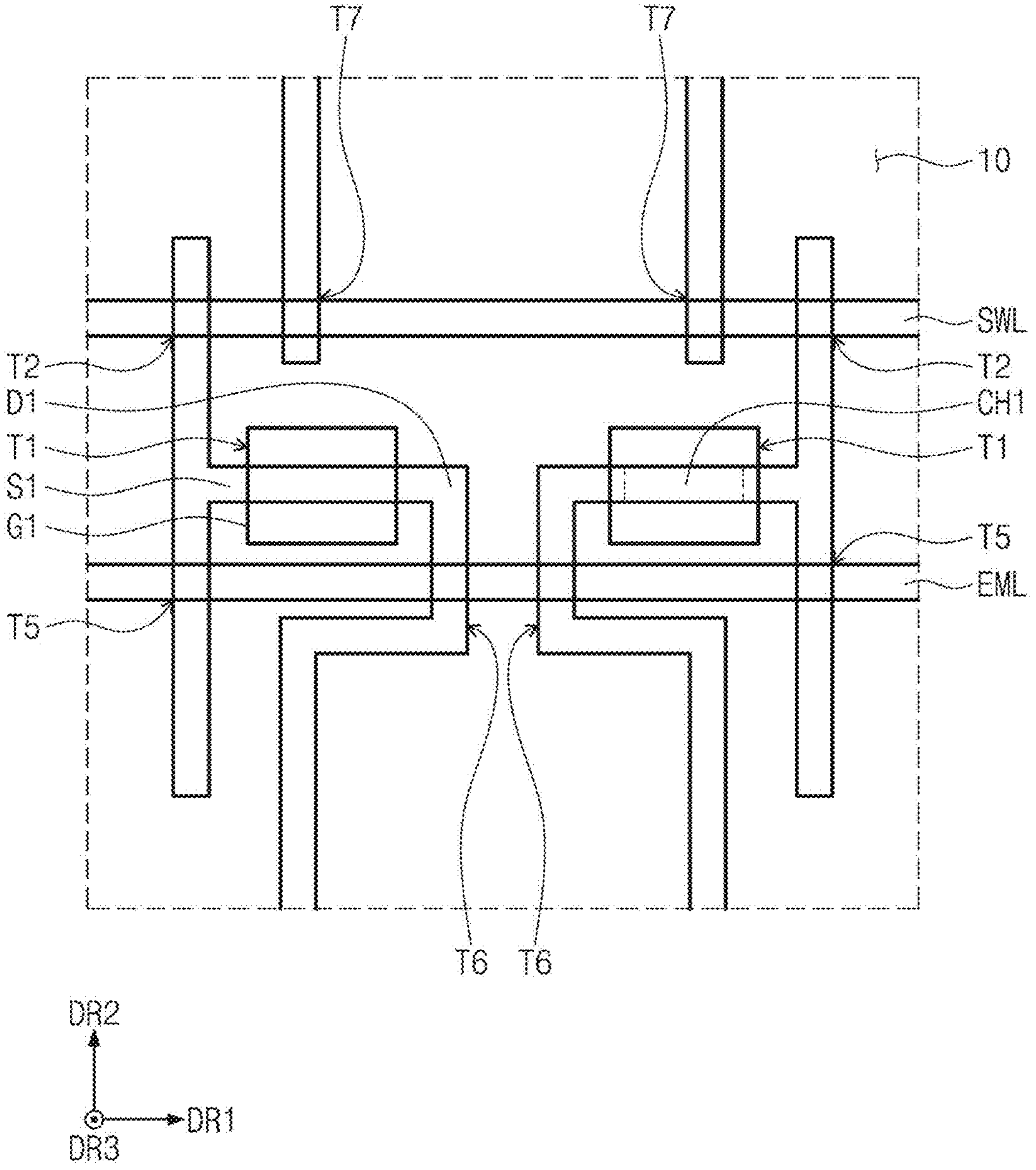
FIG. 11A is a plan view illustrating a portion of the display layer according to an embodiment of the present disclosure.

FIG. 11A is a plan view illustrating a portion of the display layer according to an embodiment of the present disclosure.

Referring to FIGS. 5 and 11A, the first electrode S1, the channel part CH1, and the second electrode D1 of the first transistor T1 may be formed under the first insulating layer 10.

The semiconductor patterns of the second transistor T2, the fifth transistor T5, the sixth transistor T6, and the seventh transistor T7 may be disposed under the first insulating layer 10.

The gate electrode G1 of the first transistor T1 may be disposed on the first insulating layer 10.

A write scan line SWL and a light emission control line EML may be disposed on the first insulating layer 10.

In other words, the first gate electrode G1 of the first transistor T1, the write scan line SWL, and the light emission control line EML may be disposed at (e.g., in or on) the same layer as each other.

Each of the write scan line SWL and the light emission control line EML may extend in the first direction DR1.

The write scan line SWL and the light emission control line EML may be spaced apart from each other in the second direction DR2.

The write scan line SWL may overlap with the semiconductor pattern of the second transistor T2 and the semiconductor pattern of the seventh transistor T7 when viewed from above the plane (e.g., in a plan view).

The write scan line SWL may be implemented as the gate electrodes of the second transistor T2 and the seventh transistor T7.

FIG. 11A illustrates an example in which the same signal is provided to the second transistor T2 and the seventh transistor T7. In this case, a black scan line SBL may be the same or substantially the same as the write scan line SWL. However, the present disclosure is not limited thereto, and signals provided to the gate electrodes of the second transistor T2 and the seventh transistor T7 according to an embodiment of the present disclosure may be different from each other. For example, the black scan signal SBj may correspond to the write scan signal SWj that is delayed by a suitable time interval (e.g., a predetermined time interval).

The light emission control line EML may overlap with the semiconductor pattern of the fifth transistor T5 and the semiconductor pattern of the sixth transistor T6 when viewed from above the plane (e.g., in a plan view).

The light emission control line EML may be implemented as the gate electrodes of the fifth transistor T5 and the sixth transistor T6.

For example, the area illustrated in FIG. 11A may be a portion corresponding to the area where the first pixel driving circuit PDC1-1 and the second pixel driving circuit PDC2-1 illustrated in FIG. 10 are disposed.

Figure 11B:
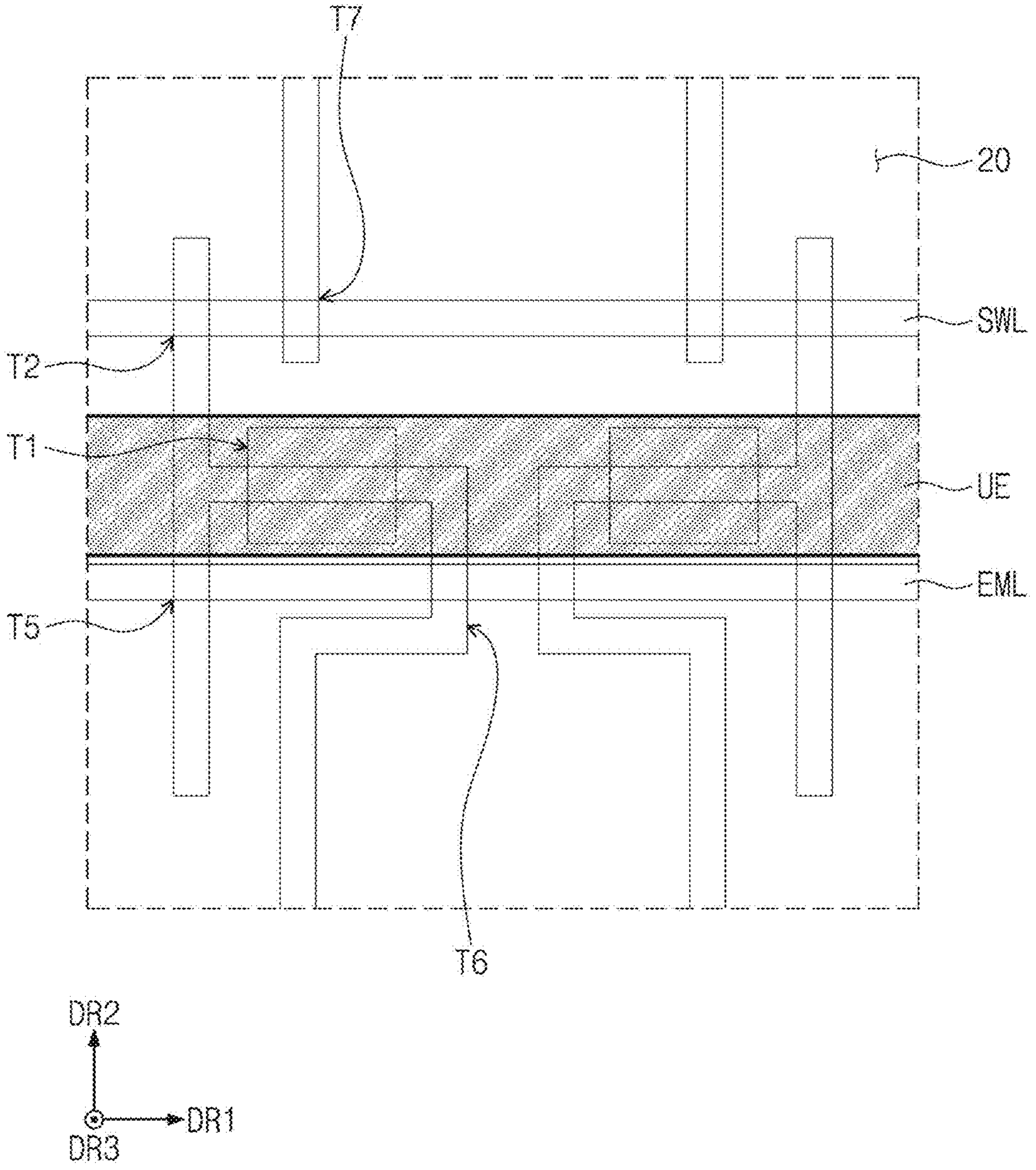
FIG. 11B is a plan view illustrating a portion of the display layer according to an embodiment of the present disclosure.

FIG. 11B is a plan view illustrating a portion of the display layer according to an embodiment of the present disclosure. In FIG. 11B, the same or substantially the same components as those described above with reference to FIG. 11A are denoted with the same reference symbols, and thus, redundant description thereof may not be repeated.

Referring to FIGS. 5 and 11B, the second insulating layer 20 may cover the gate electrode G1 of the first transistor T1, the write scan line SWL, and the light emission control line EML.

The upper electrode UE may be disposed on the second insulating layer 20.

The upper electrode UE may overlap with the gate electrode G1 (e.g., refer to FIG. 11A) of the first transistor T1 when viewed from above the plane (e.g., in a plan view).

The upper electrode UE may extend in the first direction DR1. In FIG. 11B, the lower electrode LE (e.g., refer to FIG. 9) is omitted.

Figure 11C:
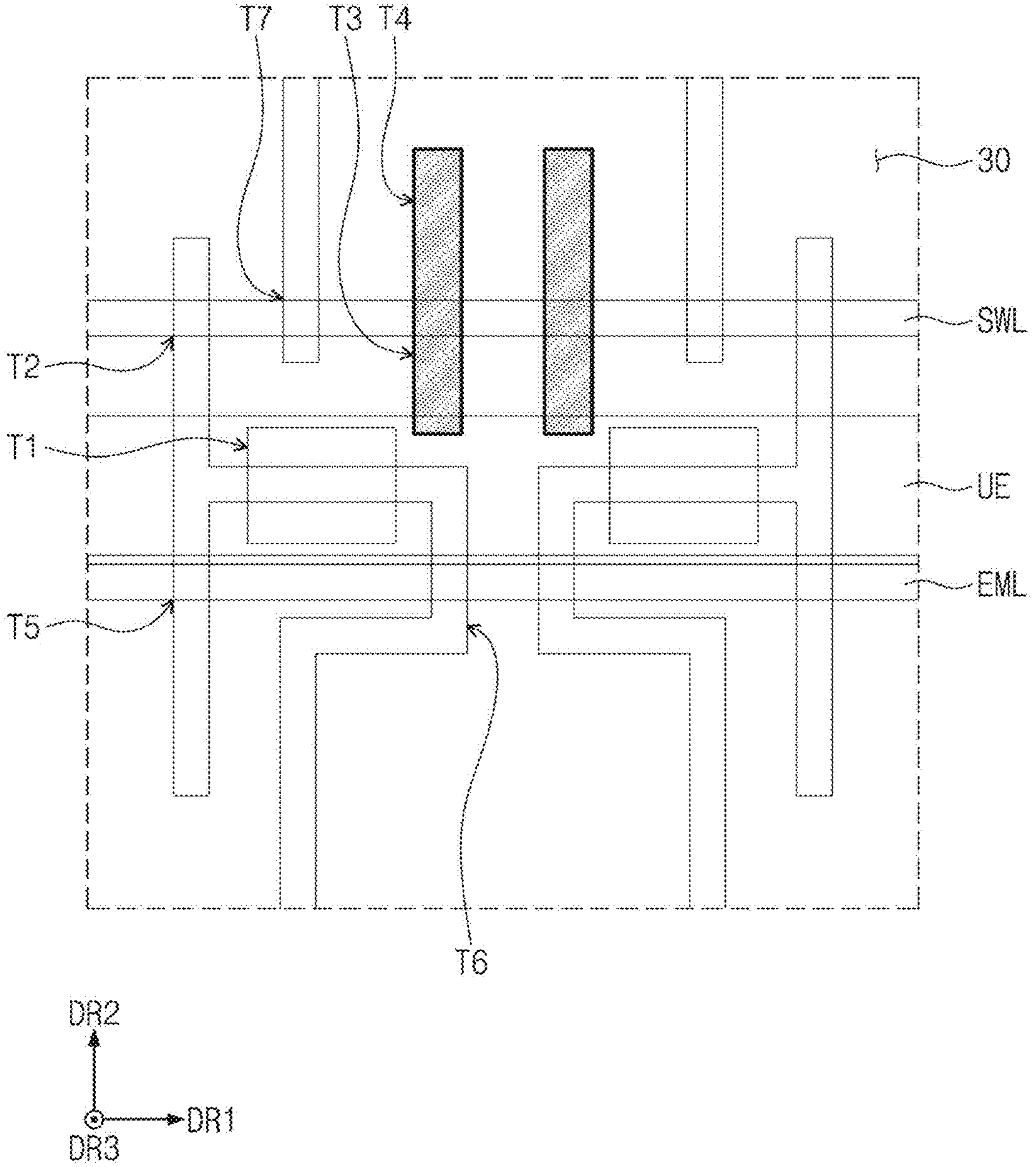
FIG. 11C is a plan view illustrating a portion of the display layer according to an embodiment of the present disclosure.

FIG. 11C is a plan view illustrating a portion of the display layer according to an embodiment of the present disclosure. In FIG. 11C, the same or substantially the same components as those described above with reference to FIGS. 11A and 11B are denoted with the same reference symbols, and thus, redundant description thereof may not be repeated.

Referring to FIGS. 5 and 11C, the third insulating layer 30 may cover the upper electrode UE.

The semiconductor patterns of the third transistor T3 and the fourth transistor T4 may be disposed on the third insulating layer 30.

Figure 11D:
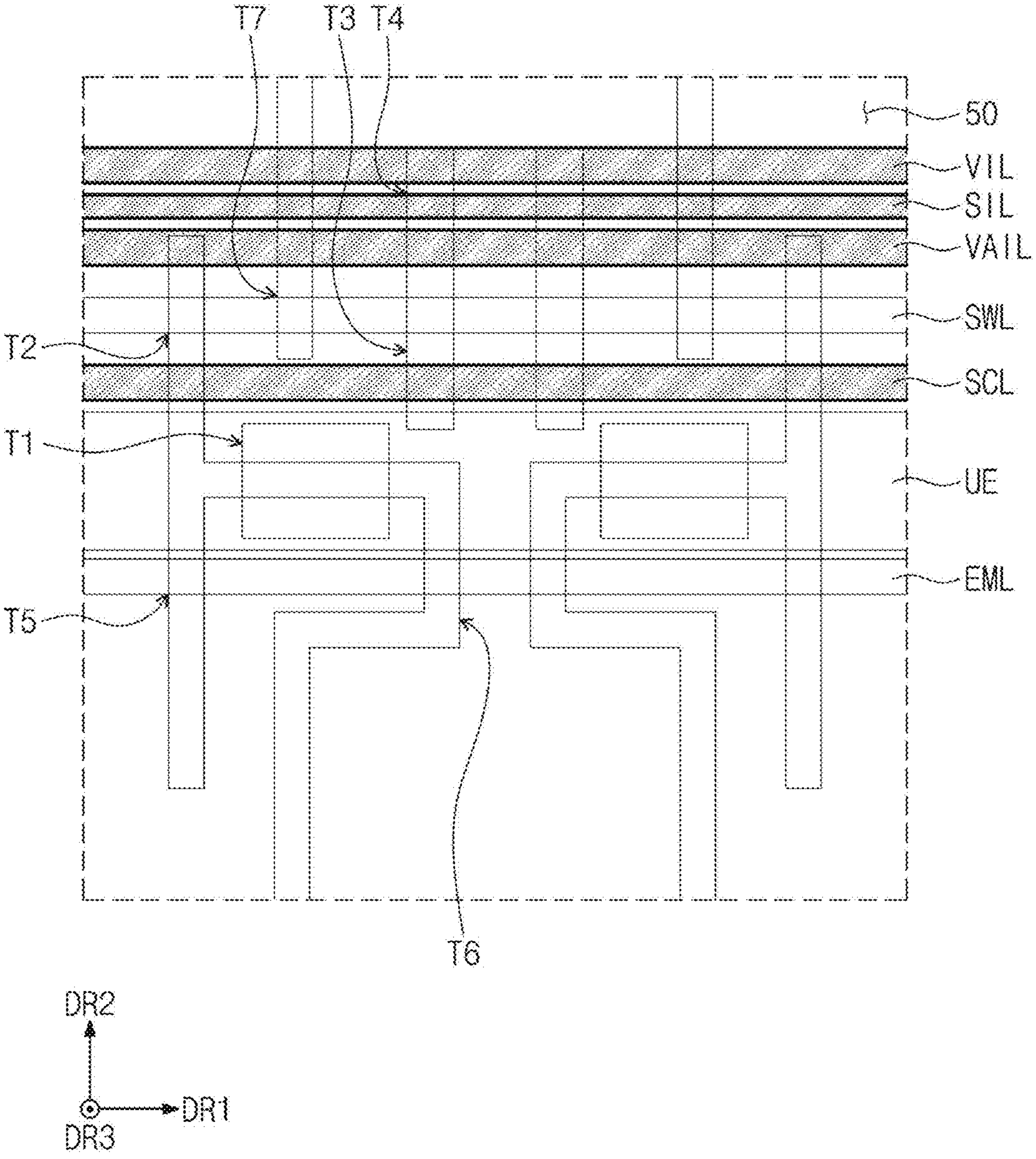
FIG. 11D is a plan view illustrating a portion of the display layer according to an embodiment of the present disclosure.

FIG. 11D is a plan view illustrating a portion of the display layer according to an embodiment of the present disclosure. In FIG. 11D, the same or substantially the same components as those described above with reference to FIGS. 11A to 11C are denoted with the same reference symbols, and thus, redundant description thereof may not be repeated.

Referring to FIGS. 5 and 11D, the fourth insulating layer 40 may cover the semiconductor patterns of the third transistor T3 and the fourth transistor T4.

A compensation scan line SCL, an initialization scan line SIL, the first initialization voltage line VIL, and the second initialization voltage line VAIL may be disposed on the fourth insulating layer 40.

In other words, the compensation scan line SCL, the initialization scan line SIL, the first initialization voltage line VIL, and the second initialization voltage line VAIL may be disposed at (e.g., in or on) the same layer as each other.

Each of the compensation scan line SCL, the initialization scan line SIL, the first initialization voltage line VIL, and the second initialization voltage line VAIL may extend in the first direction DR1.

The compensation scan line SCL, the initialization scan line SIL, the first initialization voltage line VIL, and the second initialization voltage line VAIL may be spaced apart from one another in the second direction DR2.

The compensation scan line SCL may overlap with the semiconductor pattern of the third transistor T3 when viewed from above the plane (e.g., in a plan view).

The compensation scan line SCL may be implemented as the gate electrode of the third transistor T3.

The initialization scan line SIL may overlap with the semiconductor pattern of the fourth transistor T4 when viewed from above the plane (e.g., in a plan view).

The initialization scan line SIL may be implemented as the gate electrode of the fourth transistor T4.

The first initialization voltage line VIL may be connected with the semiconductor pattern of the fourth transistor T4 through a contact hole.

The second initialization voltage line VAIL may be connected with the semiconductor pattern of the seventh transistor T7 through a contact hole.

Figure 11E:
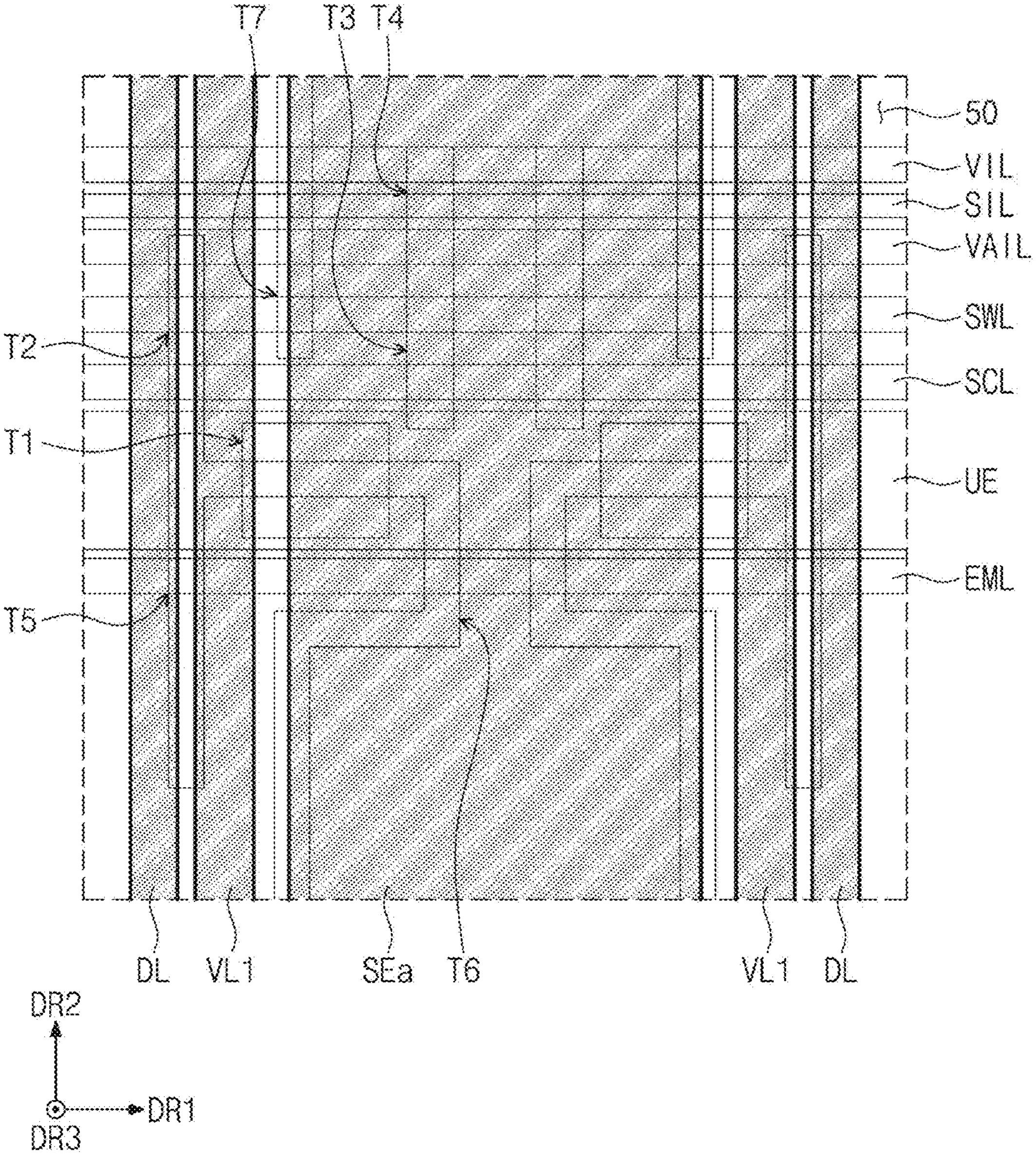
FIG. 11E is a plan view illustrating a portion of the display layer according to an embodiment of the present disclosure.

FIG. 11E is a plan view illustrating a portion of the display layer according to an embodiment of the present disclosure. In FIG. 11E, the same or substantially the same components as those described above with reference to FIGS. 11A to 11D are denoted with the same reference symbols, and thus, redundant description thereof may not be repeated.

Referring to FIGS. 5 and 11E, the display layer 100 (e.g., refer to FIG. 4) may further include a plurality of first auxiliary electrodes SEa.

The fifth insulating layer 50 may cover the compensation scan line SCL, the initialization scan line SIL, the first initialization voltage line VIL, and the second initialization voltage line VAIL.

A data line DL, the first driving voltage line VL1, and the plurality of first auxiliary electrodes SEa may be disposed on the fifth insulating layer 50.

In other words, the data line DL, the first driving voltage line VL1, and the plurality of first auxiliary electrodes SEa may be disposed at (e.g., in or on) the same layer as each other.

Each of the data line DL, the first driving voltage line VL1, and the plurality of first auxiliary electrodes SEa may extend in the second direction DR2.

The data line DL, the first driving voltage line VL1, and the plurality of first auxiliary electrodes SEa may be spaced apart from one another in the first direction DR1.

The data line DL may be connected with the semiconductor pattern of the second transistor T2 through a contact hole.

The first driving voltage line VL1 may be connected with the semiconductor pattern of the fifth transistor T5 through a contact hole.

The plurality of first auxiliary electrodes SEa may be electrically connected with the sensor driver 200C (e.g., refer to FIG. 3). The sensor driver 200C (e.g., refer to FIG. 3) may provide a charging signal to the plurality of first auxiliary electrodes SEa.

According to some embodiments of the present disclosure, a space in which the plurality of first auxiliary electrodes SEa are to be disposed may be provided over the fifth insulating layer 50. The sensor driver 200C (e.g., refer to FIG. 3) may transmit a charging signal having a period (e.g., a predetermined period) to the plurality of first auxiliary electrodes SEa. The pen PN (e.g., refer to FIG. 3) may be charged based on the charging signal. Accordingly, the electronic device 1000 capable of sensing the pen PN may be provided.

Figure 12:
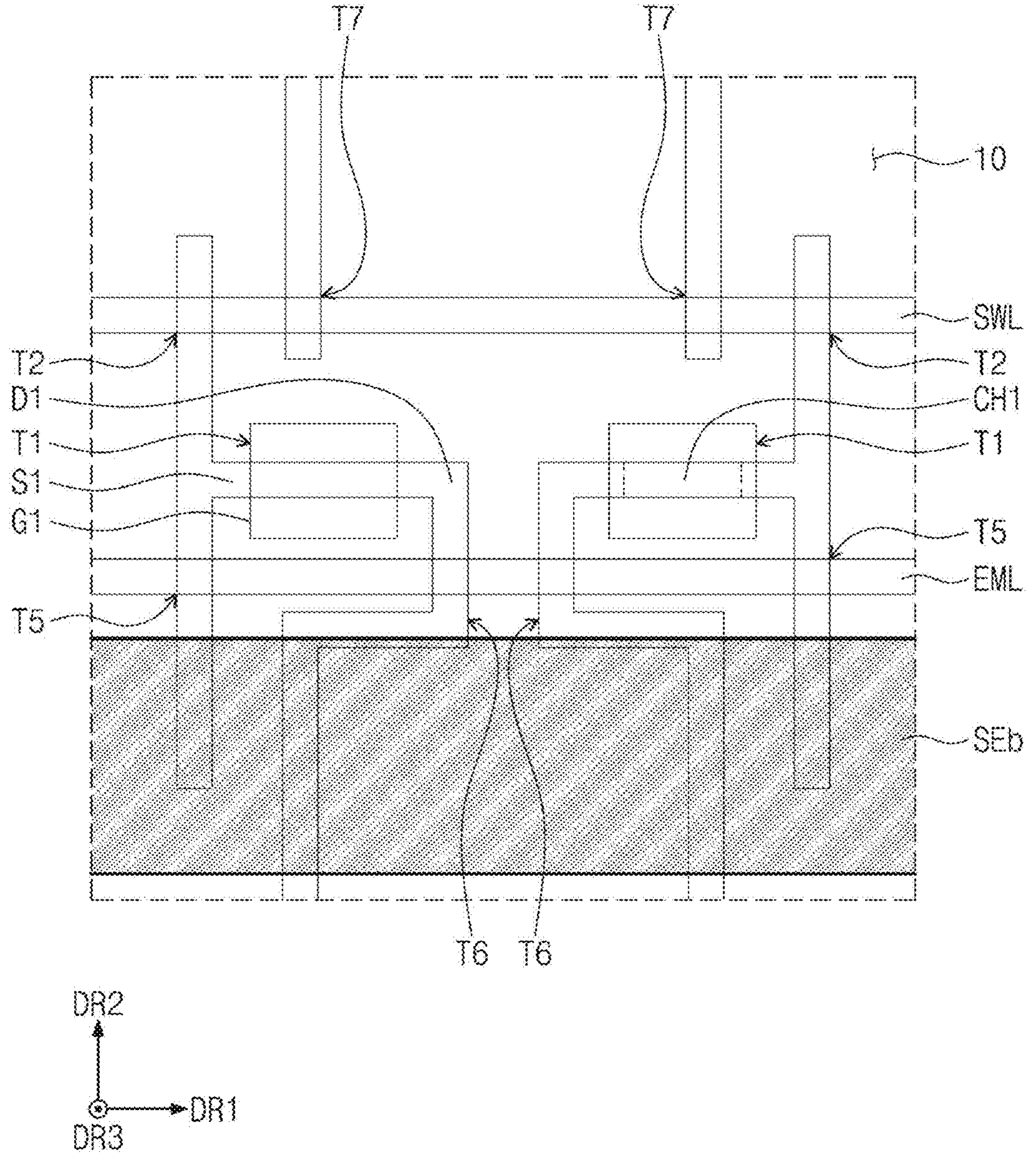
FIG. 12 is a plan view illustrating a portion of the display layer according to an embodiment of the present disclosure.

FIG. 12 is a plan view illustrating a portion of the display layer according to an embodiment of the present disclosure. In FIG. 12, the same or substantially the same components as those described above with reference to FIG. 11A are denoted with the same reference symbols, and thus, redundant description thereof may not be repeated.

Referring to FIG. 12, the display layer 100 (e.g., refer to FIG. 4) may further include a plurality of first auxiliary electrodes SEb.

The plurality of first auxiliary electrodes SEb may be disposed on the first insulating layer 10.

Each of the plurality of first auxiliary electrodes SEb may extend in the first direction DR1. The plurality of first auxiliary electrodes SEb may be spaced apart from one another in the second direction DR2.

The plurality of first auxiliary electrodes SEb may be disposed at (e.g., in or on) the same layer as that of the gate electrode G1 of the first transistor T1, the write scan line SWL, and the light emission control line EML.

The plurality of first auxiliary electrodes SEb may be connected with the sensor driver 200C (e.g., refer to FIG. 3). The sensor driver 200C (e.g., refer to FIG. 3) may provide a charging signal to the plurality of first auxiliary electrodes SEb.

According to some embodiments of the present disclosure, a space in which the plurality of first auxiliary electrodes SEb are to be disposed may be provided over the first insulating layer 10. The sensor driver 200C (e.g., refer to FIG. 3) may transmit a charging signal having a period (e.g., a predetermined period) to the plurality of first auxiliary electrodes SEb. The pen PN (e.g., refer to FIG. 3) may be charged based on the charging signal. Accordingly, the electronic device 1000 capable of sensing the pen PN may be provided.

For example, the embodiment illustrated in FIG. 12 may correspond to a configuration in which the plurality of first auxiliary electrodes SE and SEa described above with reference to FIGS. 7 and 11E are omitted, and the plurality of first auxiliary electrodes SEb are included.

Figure 13:
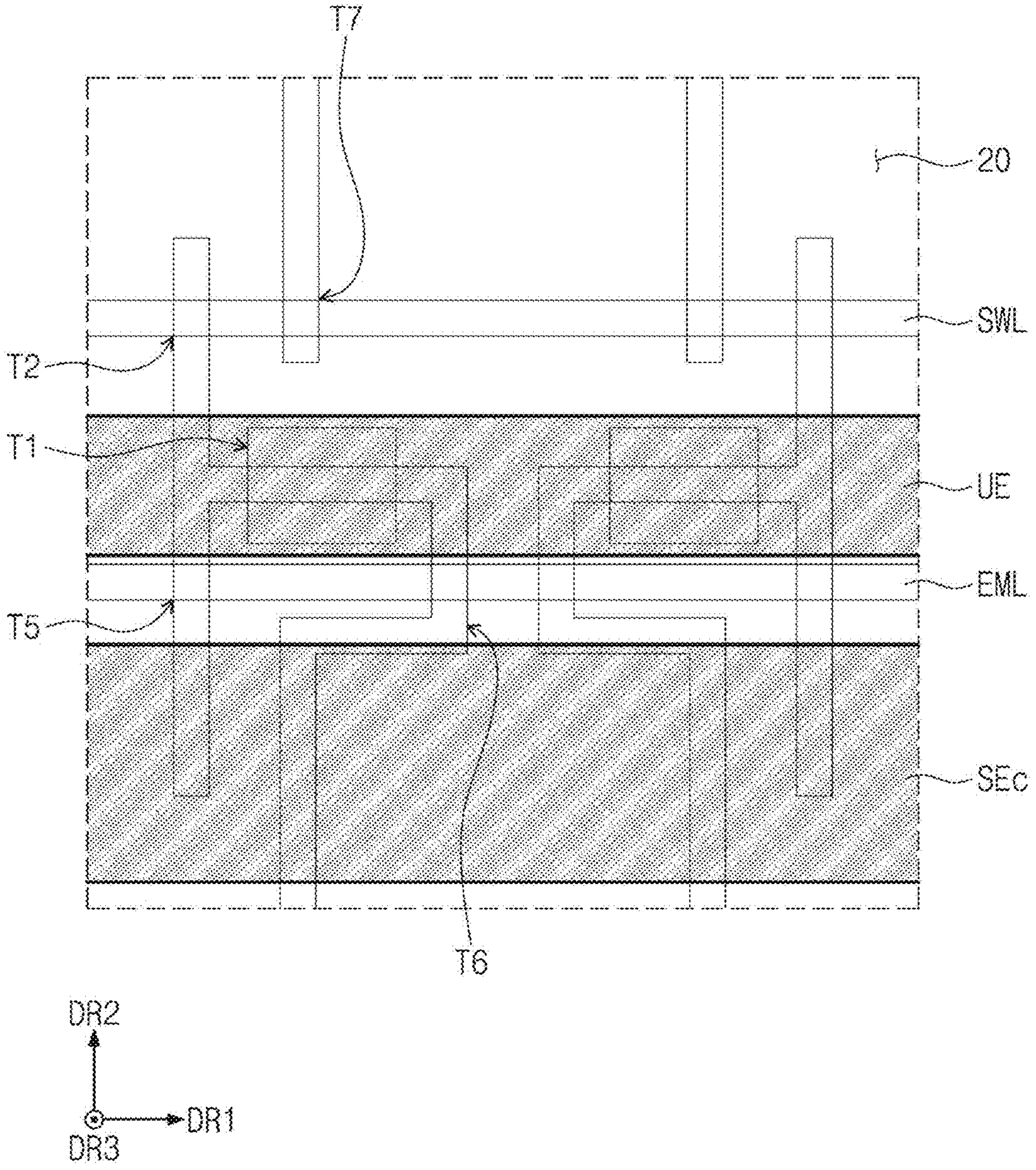
FIG. 13 is a plan view illustrating a portion of the display layer according to an embodiment of the present disclosure.

FIG. 13 is a plan view illustrating a portion of the display layer according to an embodiment of the present disclosure. In FIG. 13, the same or substantially the same components as those described above with reference to FIG. 11B are denoted with the same reference symbols, and thus, redundant description thereof may not be repeated.

Referring to FIG. 13, the display layer 100 (e.g., refer to FIG. 4) may further include a plurality of first auxiliary electrodes SEc.

The plurality of first auxiliary electrodes SEc may be disposed on the second insulating layer 20.

Each of the plurality of first auxiliary electrodes SEc may extend in the first direction DR1. The plurality of first auxiliary electrodes SEc may be spaced apart from one another in the second direction DR2.

The plurality of first auxiliary electrodes SEc may be disposed at (e.g., in or on) the same layer as that of the upper electrode UE.

The plurality of first auxiliary electrodes SEc may be connected with the sensor driver 200C (e.g., refer to FIG. 3). The sensor driver 200C (e.g., refer to FIG. 3) may provide a charging signal to the plurality of first auxiliary electrodes SEc.

According to some embodiments of the present disclosure, a space in which the plurality of first auxiliary electrodes SEc are to be disposed may be provided over the second insulating layer 20. The sensor driver 200C (e.g., refer to FIG. 3) may transmit a charging signal having a period (e.g., a predetermined period) to the plurality of first auxiliary electrodes SEc. The pen PN (e.g., refer to FIG. 3) may be charged based on the charging signal. Accordingly, the electronic device 1000 capable of sensing the pen PN may be provided.

For example, the embodiment illustrated in FIG. 13 may correspond to a configuration in which the plurality of first auxiliary electrodes SE, SEa, and SEb described above with reference to FIGS. 7, 11E, and 12 are omitted, and the plurality of first auxiliary electrodes SEc are included.

Figure 14:
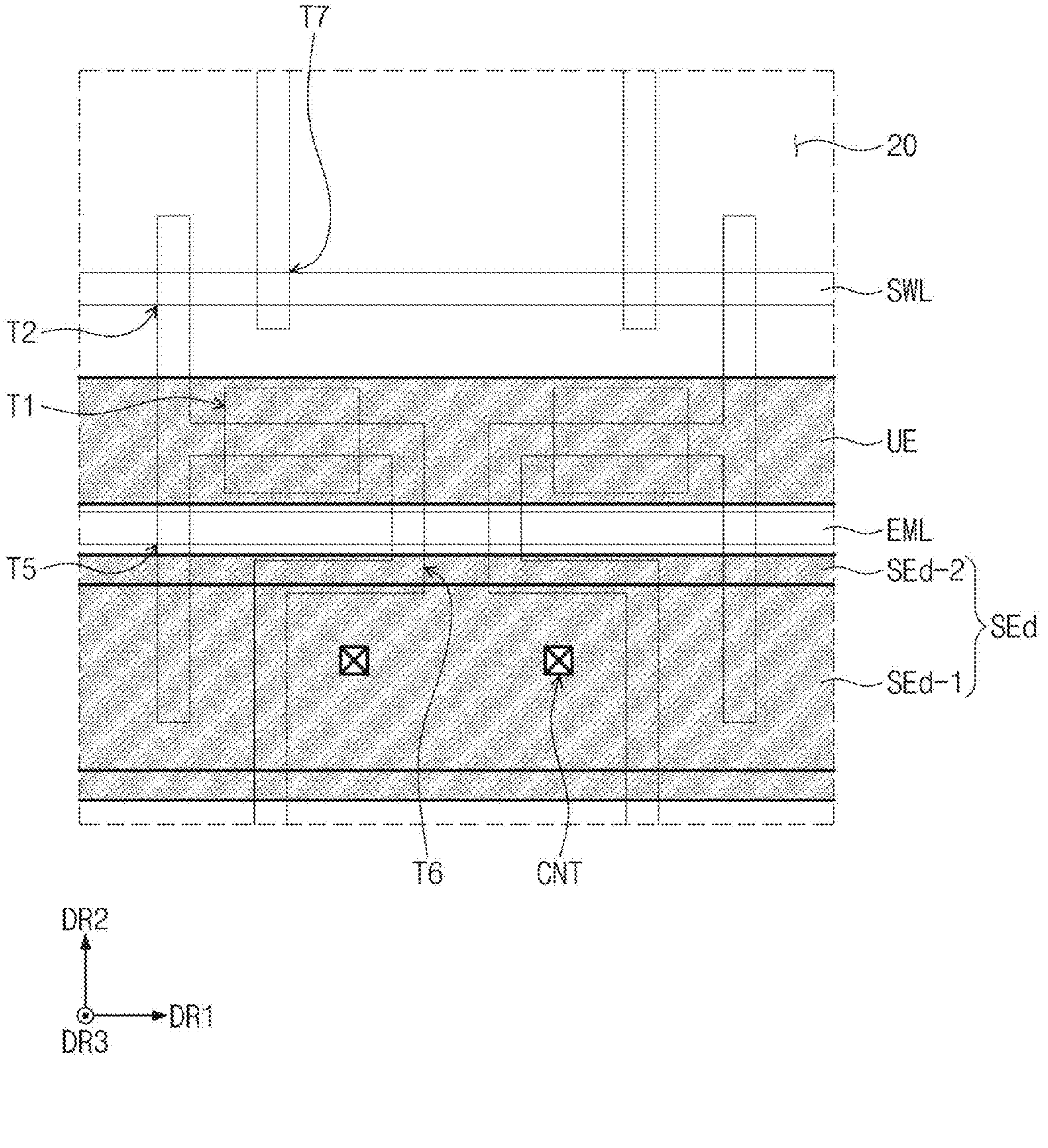
FIG. 14 is a plan view illustrating a portion of the display layer according to an embodiment of the present disclosure.

FIG. 14 is a plan view illustrating a portion of the display layer according to an embodiment of the present disclosure. In FIG. 14, the same or substantially the same components as those described above with reference to FIG. 11B are denoted with the same reference symbols, and thus, redundant description thereof may not be repeated.

Referring to FIG. 14, the display layer 100 (e.g., refer to FIG. 4) may further include a plurality of first auxiliary electrodes SEd.

Each of the plurality of first auxiliary electrodes SEd may include a first portion SEd-1 and a second portion SEd-2. The plurality of first auxiliary electrodes SEd may be spaced apart from one another in the second direction DR2.

The first portion SEd-1 may be disposed under the second insulating layer 20. The first portion SEd-1 may extend in the first direction DR1. The first portion SEd-1 may be disposed at (e.g., in or on) the same layer as that of the gate electrode G1 of the first transistor T1, the write scan line SWL, and the light emission control line EML.

The second portion SEd-2 may be disposed over the first portion SEd-1. The second portion SEd-2 may be disposed on the second insulating layer 20. The second portion SEd-2 may extend in the first direction DR1. The second portion SEd-2 may be disposed at (e.g., in or on) the same layer as that of the upper electrode UE.

The second portion SEd-2 may be connected with the first portion SEd-1 through a contact CNT penetrating in the third direction DR3.

The plurality of first auxiliary electrodes SEd may be connected with the sensor driver 200C (e.g., refer to FIG. 3). The sensor driver 200C (e.g., refer to FIG. 3) may provide a charging signal to the plurality of first auxiliary electrodes SEd.

For example, the embodiment illustrated in FIG. 14 may correspond to a configuration in which the plurality of first auxiliary electrodes SE, SEa, SEb, and SEc described above with reference to FIGS. 7, 11E, 12, and 12 are omitted, and the plurality of first auxiliary electrodes SEd are included.

Figure 15:
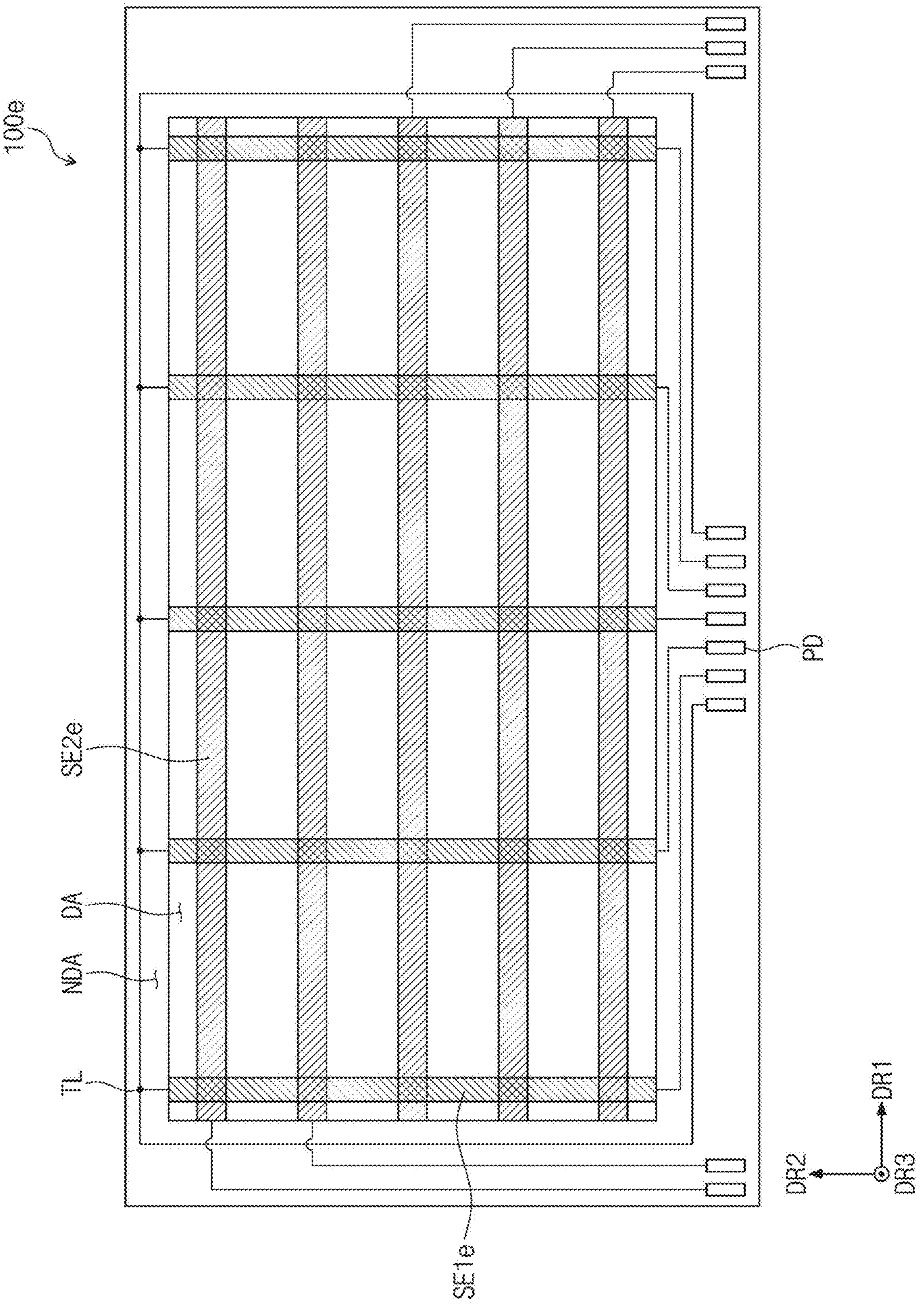
FIG. 15 is a plan view illustrating a portion of a display layer according to an embodiment of the present disclosure.

FIG. 15 is a plan view illustrating a portion of a display layer according to an embodiment of the present disclosure. In FIG. 15, the same or substantially the same components as those described above with reference to FIG. 7 are denoted with the same reference symbols, and thus, redundant description thereof may not be repeated.

Referring to FIG. 15, the display layer 100*e* may further include a plurality of first auxiliary electrodes SE1*e* and a plurality of second auxiliary electrodes SE2*e*.

Each of the plurality of first auxiliary electrodes SEle may extend in the second direction DR2. The plurality of first auxiliary electrodes SEle may be spaced apart from one another in the first direction DR1.

The plurality of first auxiliary electrodes SE1*e* may be electrically connected with the sensor driver 200C (e.g., refer to FIG. 3) through a pad part.

The plurality of first auxiliary electrodes SE1*e* may be disposed at (e.g., in or on) the same layer as that of the data line DL (e.g., refer to FIG. 11E) and the first driving voltage line VL1.

Each of the plurality of second auxiliary electrodes SE2*e* may extend in the first direction DR1. The plurality of second auxiliary electrodes SE2*e* may be spaced apart from one another in the second direction DR2. The plurality of second auxiliary electrodes SE2*e* may be insulated from the plurality of first auxiliary electrodes SE1*e*, and may cross the plurality of first auxiliary electrodes SE1*e*.

The plurality of second auxiliary electrodes SE2*e* may be electrically connected with the sensor driver 200C (e.g., refer to FIG. 3) through the pad part.

The plurality of second auxiliary electrodes SE2*e* may be disposed at (e.g., in or on) the same layer as that of at least one of the gate electrode G1 (e.g., refer to FIG. 12) of the first transistor T1 or the upper electrode UE (e.g., refer to FIG. 13).

The sensor driver 200C (e.g., refer to FIG. 3) may transmit a charging signal to at least one of the plurality of first auxiliary electrodes SE1*e* or the plurality of second auxiliary electrodes SE2*e*.

At a position where an input of the pen PN (e.g., refer to FIG. 3) is provided, the sensor driver 200C may generate the coordinates of the position where the input of the pen PN is provided, based on signals received from the plurality of first auxiliary electrodes SE1*e* and the plurality of second auxiliary electrodes SE2*e*.

According to the embodiment illustrated in FIG. 15, the plurality of second auxiliary electrodes STE and the plurality of third auxiliary electrodes SRE of the sensor layer 200 illustrated in FIG. 8 may be omitted.

Figure 16:
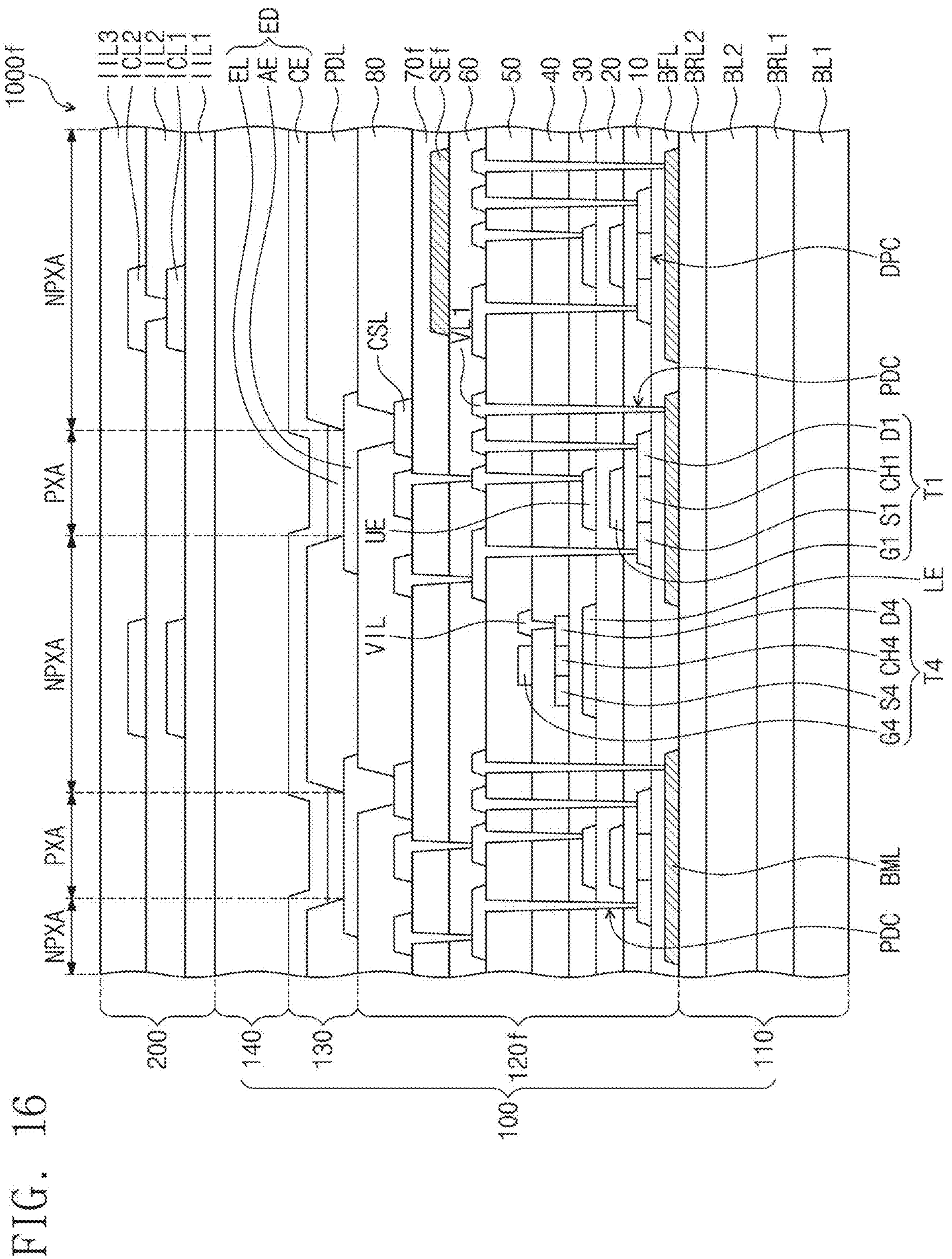
FIG. 16 is a sectional view of an electronic device according to an embodiment of the present disclosure.

FIG. 16 is a sectional view of an electronic device according to an embodiment of the present disclosure. In FIG. 16, the same or substantially the same components as those described above with reference to FIG. 9 are denoted with the same reference symbols, and thus, redundant description thereof may not be repeated.

Referring to FIG. 16, the electronic device 1000*f* may include the display layer 100 (e.g., refer to FIG. 3) and the sensor layer 200.

The display layer 100 (e.g., refer to FIG. 3) may include the base layer 110, a circuit layer 120*f*, the light emitting element layer 130, and the encapsulation layer 140. The circuit layer 120*f* may further include a plurality of first auxiliary electrodes SEf, a seventh insulating layer 70*f*, and an eighth insulating layer 80.

The plurality of first auxiliary electrodes SEf may be disposed on the sixth insulating layer 60.

The seventh insulating layer 70*f* may cover the plurality of first auxiliary electrodes SEf.

The connecting signal line CSL may be disposed on the seventh insulating layer 70*f*. The plurality of first auxiliary electrodes SEf may be disposed on a layer different from the layer on which the connecting signal line CSL is disposed. In other words, the plurality of first auxiliary electrodes SEf may be disposed on a separate layer.

The eighth insulating layer 80 may cover the connecting signal line CSL.

The plurality of first auxiliary electrodes SEf may be electrically connected with the sensor driver 200C (e.g., refer to FIG. 3). The sensor driver 200C (e.g., refer to FIG. 3) may provide a charging signal to the plurality of first auxiliary electrodes SEf.

According to some embodiments of the present disclosure, a space in which the plurality of first auxiliary electrodes SEf are to be disposed may be provided over the sixth insulating layer 60. The sensor driver 200C (e.g., refer to FIG. 3) may transmit a charging signal having a period (e.g., a predetermined period) to the plurality of first auxiliary electrodes SEf. The pen PN (e.g., refer to FIG. 3) may be charged based on the charging signal. Accordingly, the electronic device 1000*f* capable of sensing the pen PN may be provided.

Figure 17:
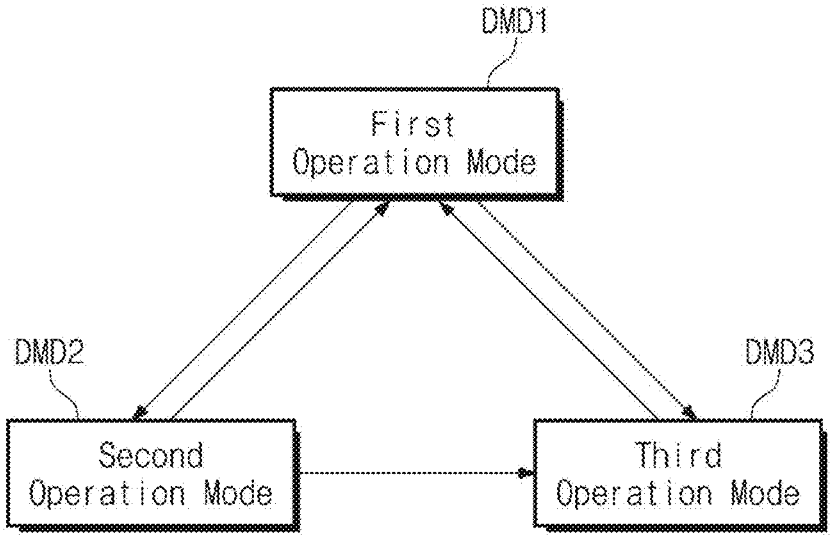
FIG. 17 is a view illustrating an operation of a sensor driver according to an embodiment of the present disclosure.

FIG. 17 is a view illustrating an operation of the sensor driver according to an embodiment of the present disclosure.

Referring to FIGS. 3 and 17, the sensor driver 200C may be selectively driven in one of a first operation mode DMD1, a second operation mode DMD2, and a third operation mode DMD3.

The first operation mode DMD1 may be referred to as a touch and pen standby mode, the second operation mode DMD2 may be referred to as a touch activation and pen standby mode, and the third operation mode DMD3 may be referred to as a pen activation mode. The first operation mode DMD1 may be a mode in which the sensor driver 200C waits for the first input 2000 and the second input 3000. The second operation mode DMD2 may be a mode in which the sensor driver 200C senses the first input 2000 and waits for the second input 3000. The third operation mode DMD3 may be a mode in which the sensor driver 200C senses the second input 3000.

In an embodiment of the present disclosure, the sensor driver 200C may be driven in the first operation mode DMD1. When the first input 2000 is sensed in the first operation mode DMD1, the sensor driver 200C may be switched (e.g., changed) to the second operation mode DMD2. As another example, when the second input 3000 is sensed in the first operation mode DMD1, the sensor driver 200C may be switched (e.g., changed) to the third operation mode DMD3.

In an embodiment of the present disclosure, when the second input 3000 is sensed in the second operation mode DMD2, the sensor driver 200C may be switched to the third operation mode DMD3. When the first input 2000 is released (e.g., not sensed) in the second operation mode DMD2, the sensor driver 200C may be switched to the first operation mode DMD1. When the second input 3000 is released (e.g., not sensed) in the third operation mode DMD3, the sensor driver 200C may be switched to the first operation mode DMD1.

Figure 18:
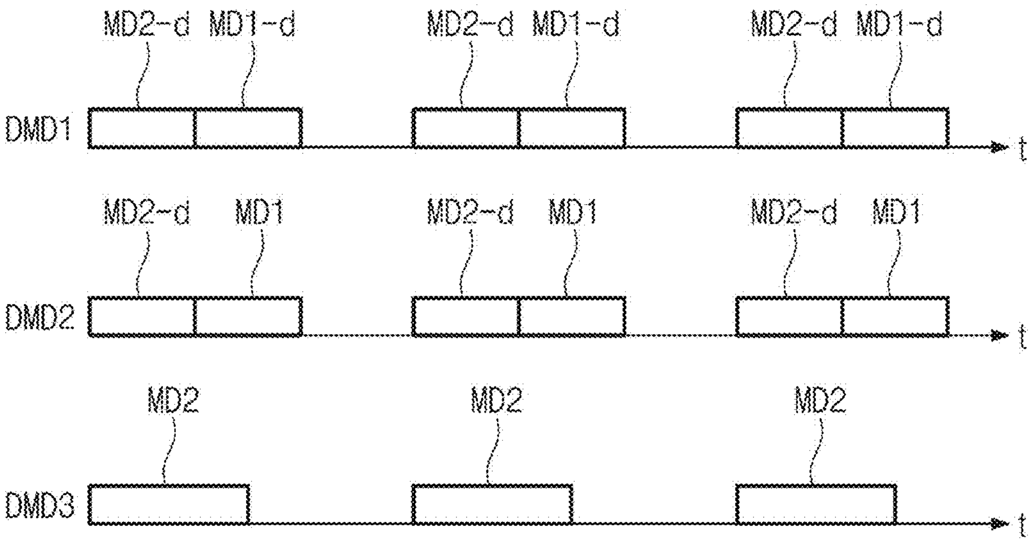
FIG. 18 is a view illustrating an operation of the sensor driver according to an embodiment of the present disclosure.

FIG. 18 is a view illustrating an operation of the sensor driver according to an embodiment of the present disclosure.

Referring to FIGS. 3, 17, and 18, operations in the first to third operation modes DMD1, DMD2, and DMD3 are illustrated in the order of time (t).

In the first operation mode DMD1, the sensor driver 200C may be repeatedly driven in a second mode MD2-*d* and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. Although FIG. 18 illustrates an example in which the sensor driver 200C operates in the first mode MD1-*d* continuously after the second mode MD2-*d*, the sequence thereof is not limited thereto.

In the second operation mode DMD2, the sensor driver 200C may be repeatedly driven in a second mode MD2-*d* and a first mode MD1. During the second mode MD2-*d*, the sensor layer 200 may be scan-driven to detect the second input 3000. During the first mode MD1, the sensor layer 200 may be scan-driven to detect the coordinates by the first input 2000.

In the third operation mode DMD3, the sensor driver 200C may be driven in a second mode MD2. During the second mode MD2, the sensor layer 200 may be scan-driven to detect the coordinates by the second input 3000. In the third operation mode DMD3, the sensor driver 200C may not operate in the first mode MD1-D or MD1 until the second input 3000 is released (e.g., not sensed).

Figure 19:
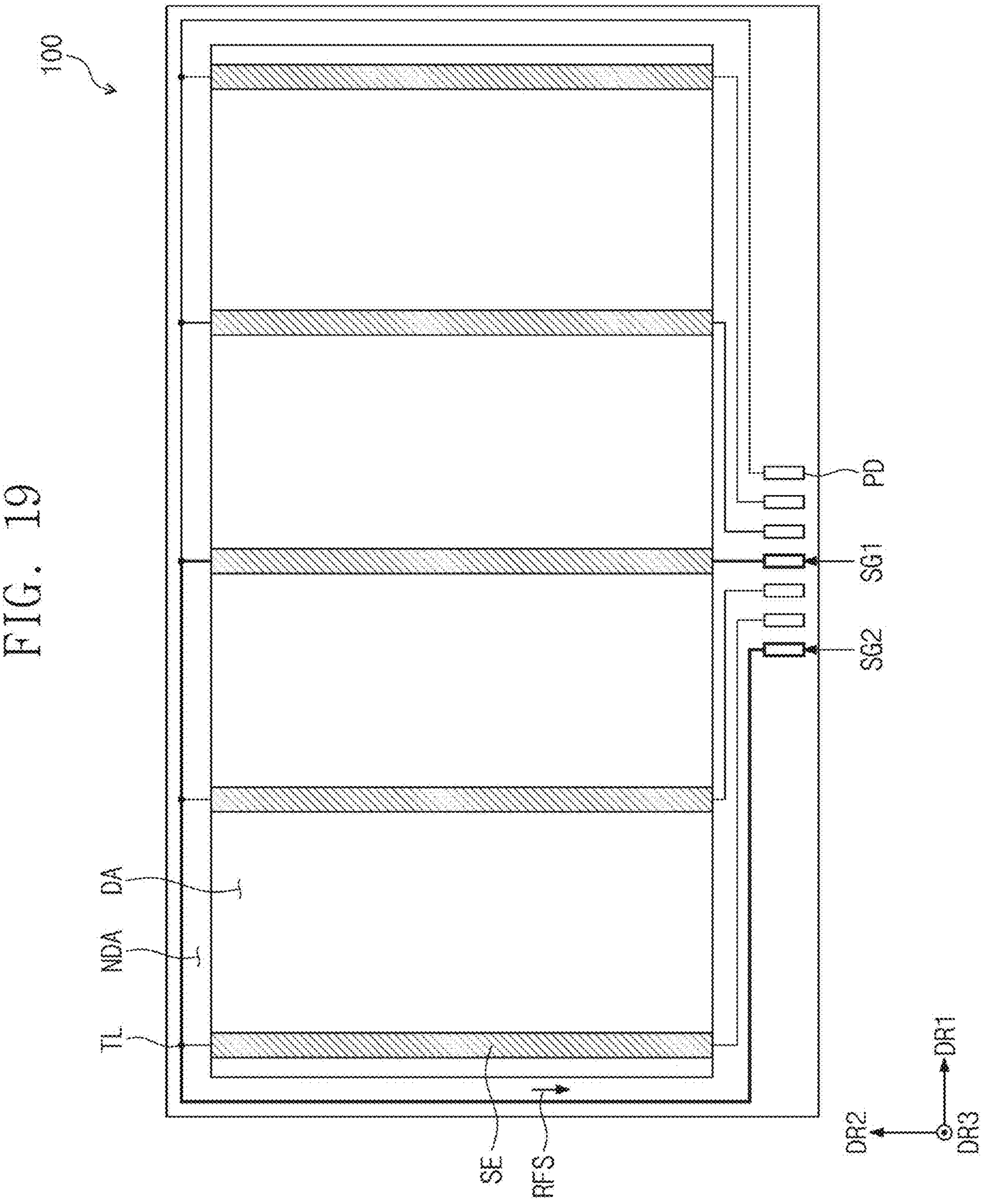
FIG. 19 is a view illustrating a second mode according to an embodiment of the present disclosure.
Figure 20A:
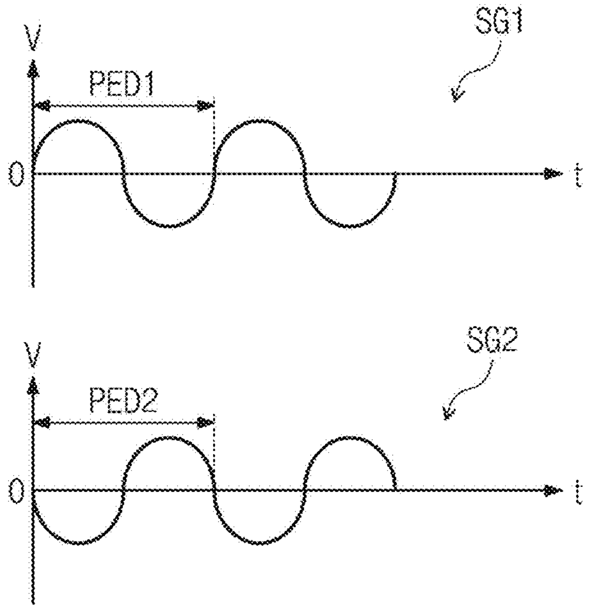
FIG. 20A illustrates graphs depicting waveforms of a first charging signal and a second charging signal according to an embodiment of the present disclosure.

FIG. 19 is a view illustrating the second mode according to an embodiment of the present disclosure. FIG. 20A illustrates graphs depicting waveforms of a first charging signal and a second charging signal according to an embodiment of the present disclosure.

Referring to FIGS. 3, 18, 19, and 20A the second mode MD2 may include a charging driving mode and a pen sensing driving mode. In addition, the charging driving mode may include a searching charging driving mode and a tracking charging driving mode.

In the charging driving mode, the sensor driver 200C may provide the charging signals SG1 and SG2 to the plurality of first auxiliary electrodes SE. The charging signals SG1 and SG2 may include the first charging signal SG1 and the second charging signal SG2.

In the charging driving mode, the sensor driver 200C may apply the first charging signal SG1 having a first period PED1 to at least one pad among the pads PD electrically connected with the plurality of first auxiliary electrodes SE, and may apply the second charging signal SG2 having a second period PED2 to at least one other pad. The first period PED1 may be the same or substantially the same as the second period PED2.

The second charging signal SG2 may be an inverse signal of the first charging signal SG1. For example, the first charging signal SG1 may be a sinusoidal signal.

Although FIG. 19 illustrates an example in which the first charging signal SG1 is applied to one pad and the second charging signal SG2 is applied to another pad, the present disclosure is not limited thereto. For example, the first charging signal SG1 may be applied to two or more pads, and the second charging signal SG2 may be applied to two or more other pads.

Because the first charging signal SG1 and the second charging signal SG2 are applied to at least two pads, a current RFS may have a current path to flow to at least one pad through at least one other pad. Furthermore, because the first charging signal SG1 and the second charging signal SG2 may be sinusoidal signals having an inverse phase relationship, the direction of the current RFS may be periodically varied.

The first charging signal SG1 may have an inverse phase relationship with the second charging signal SG2. Accordingly, a noise that may be caused in the display layer 100 (e.g., refer to FIG. 3) by the first charging signal SG1 may cancel out noise that may be caused by the second charging signal SG2. Thus, a flicker phenomenon may not occur in the display layer 100, and the display quality of the display layer 100 may be improved.

The current path may have a coil shape. Accordingly, in the charging driving mode of the second mode MD2, the resonance circuit of the pen PN may be charged by the current path.

According to some embodiments of the present disclosure, a current path having a loop coil pattern may be implemented by the plurality of first auxiliary electrodes SE included in the sensor layer 100. Accordingly, the electronic device 1000 (e.g., refer to FIG. 1) may charge the pen PN using the display layer 100. Thus, a component having a coil for charging the pen PN may not need to be separately added or used, so that an increase in the thickness and weight of the electronic device 1000 and a decrease in the flexibility of the electronic device 1000 due to the addition of such a component may not occur.

Figure 20B:
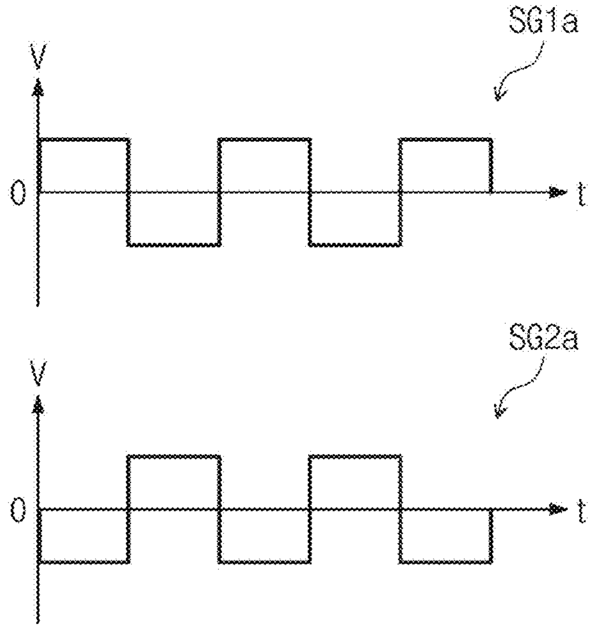
FIG. 20B illustrates graphs depicting waveforms of a first charging signal and a second charging signal according to an embodiment of the present disclosure.

FIG. 20B illustrates graphs depicting waveforms of the first charging signal and the second charging signal according to an embodiment of the present disclosure.

Referring to FIG. 20B, the first charging signal SG1*a* and the second charging signal SG2*a* may be square-wave signals. The second charging signal SG2*a* may be an inverse signal of the first charging signal SG1*a*. Because the first charging signal SG1*a* and the second charging signal SG2*a* are applied to at least two pads, a current RFS may have a current path to flow to at least one pad through at least one other pad. In addition, because the first charging signal SG1*a* and the second charging signal SG2*a* are square-wave signals having an inverse phase relationship, the direction of the current RFS may be periodically varied.

Figure 21A:
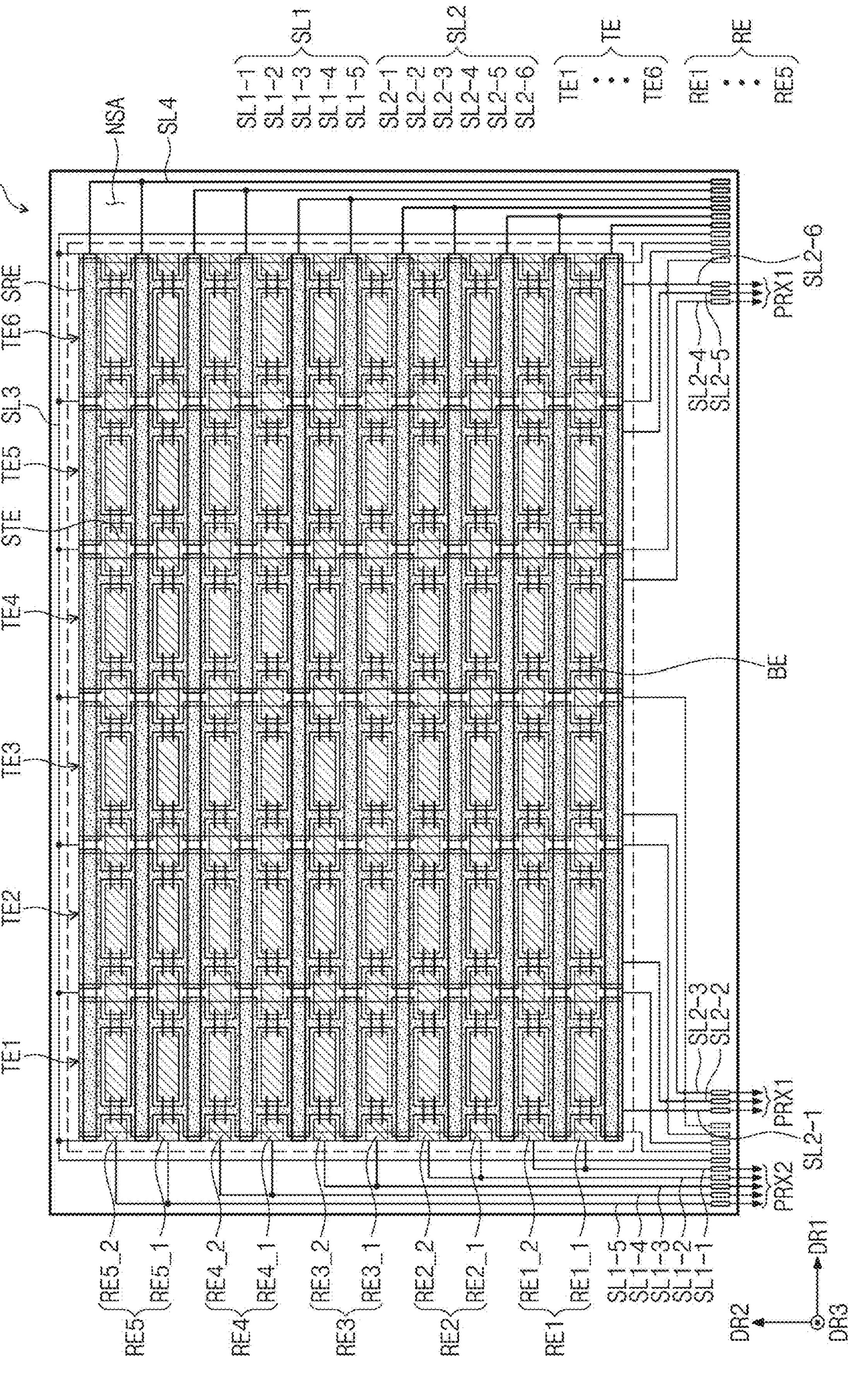
FIG. 21A is a view illustrating the second mode according to an embodiment of the present disclosure.

FIG. 21A is a view illustrating the second mode according to an embodiment of the present disclosure. In FIG. 21A, the same or substantially the same components as those described above with reference to FIG. 8 are denoted with the same reference symbols, and thus, redundant description thereof may not be repeated.

Referring to FIGS. 3 and 21A, the RLC resonance circuit of the pen PN may emit a magnetic field having a suitable resonant frequency (e.g., a predetermined resonant frequency) while discharging charged charges. An induced current may be generated in each of the plurality of first electrodes TE, the plurality of second electrodes RE, the plurality of second auxiliary electrodes STE, and the plurality of third auxiliary electrodes SRE by the magnetic field provided from the pen PN.

A first coupling capacitor may be formed between the plurality of second auxiliary electrodes STE and the plurality of first electrodes TE, and a second coupling capacitor may be formed between the plurality of third auxiliary electrodes SRE and the plurality of second electrodes RE.

The induced currents formed in the plurality of second auxiliary electrodes STE may be transferred to the plurality of first electrodes TE, respectively, through the first coupling capacitor. The induced currents formed in the plurality of third auxiliary electrodes SRE may be transferred to the plurality of second electrodes RE, respectively, through the second coupling capacitor.

The sensor driver 200C may receive a first reception signal PRX1 from the plurality of first electrodes TE, and may receive a second reception signal PRX2 from the plurality of second electrodes RE. The sensor driver 200C may detect the input coordinates of the pen PN based on the first reception signal PRX1 and the second reception signal PRX2. For example, the sensor driver 200C may detect the x-coordinate of the pen PN based on the first reception signal PRX1, and may detect the y-coordinate of the pen PN based on the second reception signal PRX2.

Figure 21B:
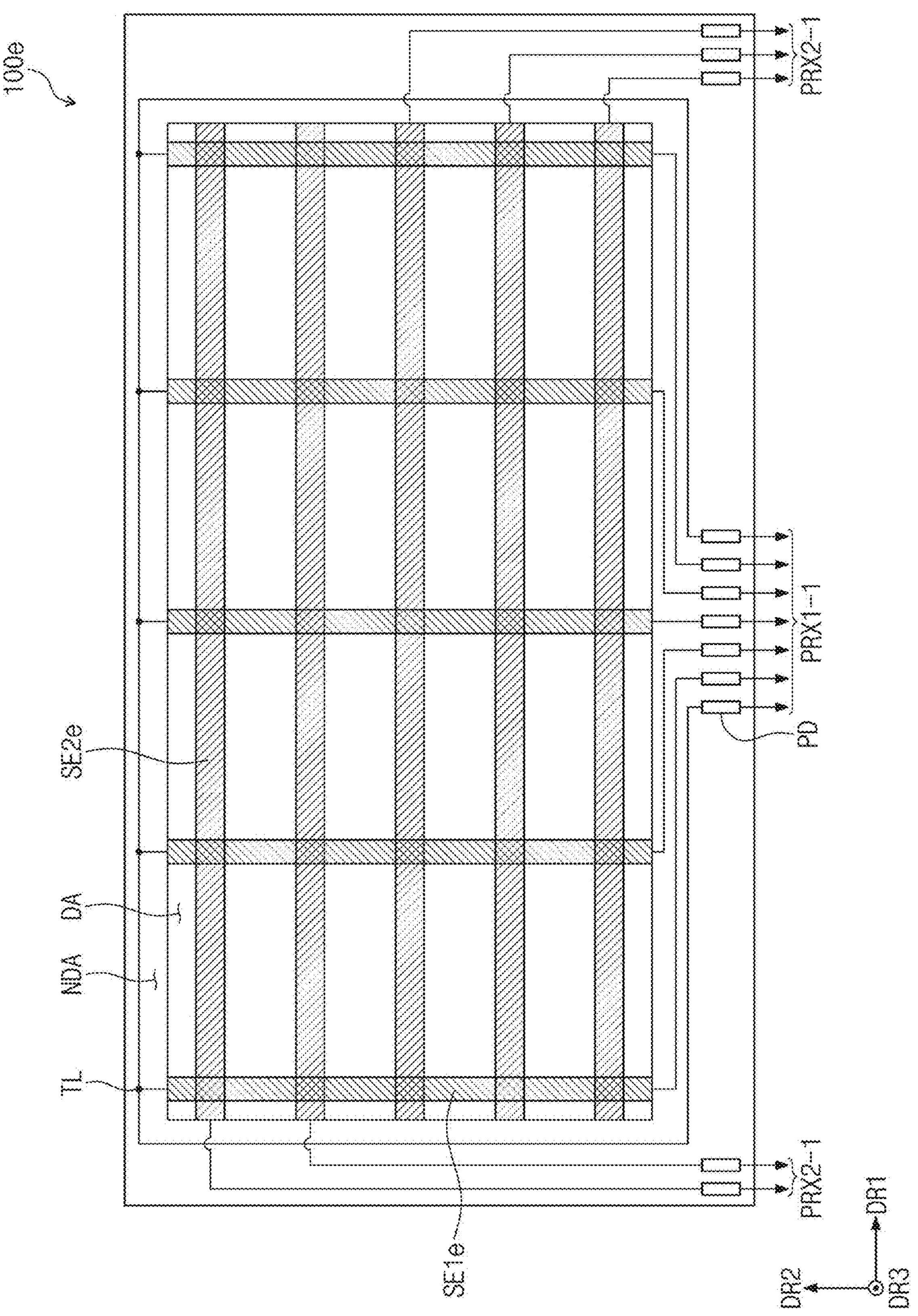
FIG. 21B is a view illustrating the second mode according to an embodiment of the present disclosure.

FIG. 21B is a view illustrating the second mode according to an embodiment of the present disclosure. In FIG. 21B, the same or substantially the same components as those described above with reference to FIG. 15 are denoted with the same reference symbols, and thus, redundant description thereof may not be repeated.

Referring to FIGS. 3 and 21B, the RLC resonance circuit of the pen PN may emit a magnetic field having a suitable resonant frequency (e.g., a predetermined resonant frequency) while discharging charged charges. An induced current may be generated in each of the plurality of first auxiliary electrodes SE1*e* and the plurality of second auxiliary electrodes SE2*e* by the magnetic field provided from the pen PN.

The sensor driver 200C may receive a first reception signal PRX1-1 from the plurality of first auxiliary electrodes SEle, and may receive a second reception signal PRX2-1 from the plurality of second auxiliary electrodes SE2*e*. The sensor driver 200C may detect the input coordinates of the pen PN, based on the first reception signal PRX1-1 and the second reception signal PRX2-1. For example, the sensor driver 200C may detect the x-coordinate of the pen PN based on the first reception signal PRX1-1, and may detect the y-coordinate of the pen PN based on the second reception signal PRX2-1.

In this case, the plurality of second auxiliary electrodes STE and the plurality of third auxiliary electrodes SRE of the sensor layer 200 (e.g., refer to FIG. 21A) may be omitted.

As described above, the dummy pixel circuit may not be connected with the light emitting element, and thus, the space in which the plurality of first auxiliary electrodes are to be disposed may be provided over the dummy pixel circuit. The sensor driver may transmit the charging signal having the period (e.g., the predetermined period) to the plurality of first auxiliary electrodes. The pen may be charged based on the charging signal. Accordingly, the electronic device capable of sensing the pen may be provided.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a display layer having a display area, and a non-display area adjacent to the display area, the display layer comprising:
- a base layer;
- a circuit layer on the base layer, and comprising:
  - a pixel driving circuit; and
  - a plurality of first auxiliary electrodes electrically connected with one another, the plurality of first auxiliary electrodes located along one of a first direction or a second direction crossing the first direction, and extending in another one of the first direction or the second direction;
- a light emitting element layer on the circuit layer, and comprising a light emitting element electrically connected with the pixel driving circuit; and
- an encapsulation layer on the light emitting element layer; and
- a sensor layer on the display layer, and comprising:
  - a plurality of first electrodes located along the first direction, and extending in the second direction; and
  - a plurality of second electrodes located along the second direction, and extending in the first direction, wherein the plurality of first auxiliary electrodes are located between the base layer and the light emitting element layer.

2. The electronic device of claim 1, wherein the circuit layer further comprises a plurality of dummy pixel circuits at the same layer as that of the pixel driving circuit, and wherein the plurality of dummy pixel circuits overlaps with the plurality of first auxiliary electrodes in a plan view.

3. The electronic device of claim 1, wherein the pixel driving circuit does not overlap with the plurality of first auxiliary electrodes in a plan view.

4. The electronic device of claim 1, wherein the circuit layer further comprises a connecting line in the non-display area, and connected with the plurality of first auxiliary electrodes.

5. The electronic device of claim 1, wherein the circuit layer further comprises a data line configured to receive a data signal, and electrically connected with the pixel driving circuit, and wherein the plurality of first auxiliary electrodes are at the same layer as that of the data line.

6. The electronic device of claim 5, wherein the circuit layer further comprises a first power line configured to provide a first driving voltage to the pixel driving circuit, the first power line being located at the same layer as that of the data line.

7. The electronic device of claim 1, wherein the circuit layer further comprises a plurality of second auxiliary electrodes located along the second direction, and extending in the first direction, and wherein the plurality of first auxiliary electrodes are insulated from the plurality of second auxiliary electrodes, and cross the plurality of second auxiliary electrodes.

8. The electronic device of claim 1, further comprising:

a sensor driver configured to drive the sensor layer, wherein the sensor driver is configured to provide a charging signal having a sinusoidal wave to the plurality of first auxiliary electrodes.

9. The electronic device of claim 1, wherein the pixel driving circuit comprises a driving transistor comprising a gate electrode, and wherein the plurality of first auxiliary electrodes are at the same layer as that of the gate electrode.

10. The electronic device of claim 9, wherein the plurality of first auxiliary electrodes overlap with the pixel driving circuit in a plan view.

11. The electronic device of claim 1, wherein the pixel driving circuit comprises a driving transistor comprising:

a gate electrode; and an upper electrode over the gate electrode.

12. The electronic device of claim 11, wherein the plurality of first auxiliary electrodes are at the same layer as that of the upper electrode.

13. The electronic device of claim 11, wherein each of the plurality of first auxiliary electrodes comprises a first portion, and a second portion over the first portion and connected with the first portion through a contact, wherein the first portion is at the same layer as that of the gate electrode, and wherein the second portion is at the same layer as that of the upper electrode.

14. The electronic device of claim 11, wherein the circuit layer further comprises a lower metal layer under the gate electrode.

15. The electronic device of claim 1, wherein the sensor layer further comprises:

a plurality of second auxiliary electrodes along the first direction, and extending in the second direction; and a plurality of third auxiliary electrodes along the second direction, and extending in the first direction.

16. The electronic device of claim 15, wherein the plurality of first electrodes are at a different layer from that of the plurality of second auxiliary electrodes.

17. An electronic device comprising:

a display layer comprising:

a base layer;

a circuit layer on the base layer, and comprising:

a pixel driving circuit; and a plurality of first auxiliary electrodes along one of a first direction or a second direction crossing the first direction, and extending in another one of the first direction or the second direction, the plurality of first auxiliary electrodes being electrically connected with one another;

a light emitting element layer on the circuit layer, and comprising a light emitting element electrically connected with the pixel driving circuit; and an encapsulation layer on the light emitting element layer;

a sensor layer on the display layer, the sensor layer comprising a plurality of sensing electrodes; and a sensor driver configured to drive the sensor layer, and provide a charging signal having a period to the plurality of first auxiliary electrodes, wherein the plurality of first auxiliary electrodes are located between the base layer and the light emitting element layer.

18. The electronic device of claim 17, wherein the circuit layer further comprises a plurality of dummy pixel circuits at the same layer as that of the pixel driving circuit, and wherein the plurality of dummy pixel circuits overlap with the plurality of first auxiliary electrodes in a plan view.

19. The electronic device of claim 17, wherein the circuit layer further comprises a data line configured to receive a data signal, and electrically connected with the pixel driving circuit, and wherein the plurality of first auxiliary electrodes are at the same layer as that of the data line.

20. The electronic device of claim 17, wherein the pixel driving circuit comprises a driving transistor comprising a gate electrode, and wherein the plurality of first auxiliary electrodes are at the same layer as that of the gate electrode.

21. A multimedia electronic device comprising:

a pen;

a display layer having a display area, and a non-display area adjacent to the display area, the display layer comprising:

a base layer;

a circuit layer on the base layer, and comprising:

a pixel driving circuit; and a plurality of first auxiliary electrodes electrically connected with one another, the plurality of first auxiliary electrodes located along one of a first direction or a second direction crossing the first direction, and extending in another one of the first direction or the second direction;

a light emitting element layer on the circuit layer, and comprising a light emitting element electrically connected with the pixel driving circuit; and an encapsulation layer on the light emitting element layer; and a sensor layer on the display layer, and configured to detect an input by the pen, the sensor layer comprising:

a plurality of first electrodes located along the first direction, and extending in the second direction; and a plurality of second electrodes located along the second direction, and extending in the first direction, wherein the multimedia electronic device is one of a mobile phone, a foldable mobile phone, a notebook computer, a television, a tablet computer, a car navigation device, a game machine, or a wearable device, and wherein the plurality of first auxiliary electrodes are located between the base layer and the light emitting element layer.

22. The multimedia electronic device of claim 21, wherein the circuit layer further comprises a plurality of dummy pixel circuits at the same layer as that of the pixel driving circuit, and wherein the plurality of dummy pixel circuits overlaps with the plurality of first auxiliary electrodes in a plan view.

23. The multimedia electronic device of claim 21, wherein the pixel driving circuit does not overlap with the plurality of first auxiliary electrodes in a plan view.

* * * * *